United States Patent
Yamane

(10) Patent No.: US 9,630,094 B2
(45) Date of Patent: Apr. 25, 2017

(54) NON-TRANSITORY STORAGE MEDIUM ENCODED WITH COMPUTER READABLE MUSIC GAME PROGRAM WITH WHICH, IN PLAYING MULTIPLAYER GAME THROUGH COMMUNICATION, UNCOMFORTABLENESS DUE TO INFLUENCE SUCH AS DELAY IN COMMUNICATION IS SUPPRESSED AND OPERATION IS PERFORMED IN MORE REAL-TIME PERFORMANCE ENVIRONMENT, GAME DEVICE, METHOD OF CONTROLLING GAME DEVICE, AND GAME SYSTEM

(71) Applicant: NINTENDO CO., LTD., Kyoto-shi, Kyoto (JP)

(72) Inventor: Takaya Yamane, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 265 days.

(21) Appl. No.: 14/174,414

(22) Filed: Feb. 6, 2014

(65) Prior Publication Data
US 2014/0221096 A1    Aug. 7, 2014

(30) Foreign Application Priority Data

Feb. 7, 2013  (JP) .................................. 2013-022185

(51) Int. Cl.
*A63F 13/00* (2014.01)
*A63F 13/40* (2014.01)
*A63F 13/30* (2014.01)

(52) U.S. Cl.
CPC .............. *A63F 13/10* (2013.01); *A63F 13/12* (2013.01); *A63F 2300/204* (2013.01);
(Continued)

(58) Field of Classification Search
CPC ...... A63F 13/10; A63F 13/12; G10H 2220/00
See application file for complete search history.

(56) References Cited

U.S. PATENT DOCUMENTS 6,482,087 B1 * 11/2002 Egozy ..................... A63F 13/12
                                                463/42
2008/0096667 A1    4/2008 Konuma
(Continued)

FOREIGN PATENT DOCUMENTS

JP        2000-502276        2/2000
JP        2008-113766        5/2008
(Continued)

*Primary Examiner* — James S McClellan
*Assistant Examiner* — Sylvia Weatherford
(74) *Attorney, Agent, or Firm* — Nixon & Vanderhye PC

(57) ABSTRACT

A non-transitory storage medium encoded with a computer readable music game program, the music game program causing the one or more processors to perform including a communication unit configured to obtain from another game device through communication, data relating to operation input to another game device, a presentation data generation unit configured to generate presentation data in accordance with the operation input to the game device, an estimated presentation data generation unit configured to estimate, based on data relating to the operation input to another game device for a first portion of the music data obtained through the communication unit, presentation in accordance with the operation input to another game device for a second portion of the music data and generate estimated presentation data representing the presentation, and a game processing unit configured to perform the game process based on the presentation data and the estimated presentation data.

16 Claims, 21 Drawing Sheets

(52) U.S. Cl.
CPC ... *A63F 2300/301* (2013.01); *A63F 2300/556* (2013.01); *A63F 2300/5593* (2013.01); *A63F 2300/6063* (2013.01); *A63F 2300/8047* (2013.01)

(56) References Cited

U.S. PATENT DOCUMENTS

| | | |
|---|---|---|
| 2008/0102958 A1 | 5/2008 | Kitamura et al. |
| 2008/0113698 A1* | 5/2008 | Egozy ............... A63F 13/12 463/7 |

FOREIGN PATENT DOCUMENTS

| | | |
|---|---|---|
| JP | 2008-134295 | 6/2008 |
| JP | 2010-510547 | 4/2010 |
| WO | WO 98/14898 | 4/1998 |
| WO | WO 2006/057185 | 6/2006 |
| WO | WO 2008/061169 | 5/2008 |

* cited by examiner

FIG.19
- PERFORMANCE FLAG DATA OF SIXTEENTH NOTE
(LENGTH OF 1/4 OF ONE BEAT)
(A) 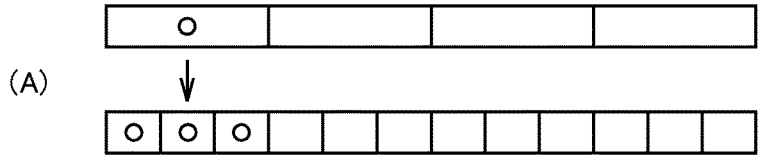
- PERFORMANCE FLAG DATA OF TRIPLET
(LENGTH OF 1/3 OF ONE BEAT)
(B) 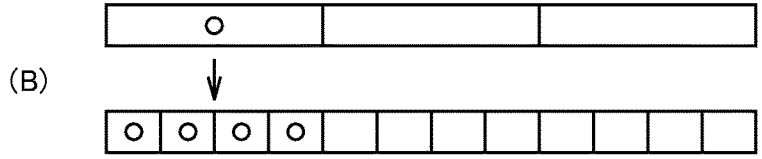
- PERFORMANCE FLAG DATA OF QUARTER-NOTE TRIPLET
(LENGTH OF 1/3 OF TWO BEATS ⇒ LENGTH OF 2/3 OF ONE BEAT)
(C) 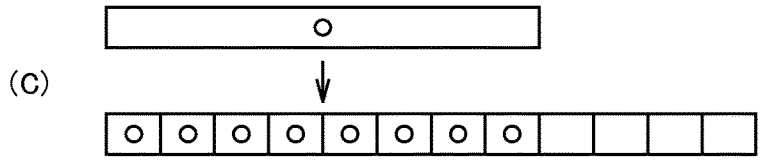

FIG.20
PERFORMANCE FLAG DATA: 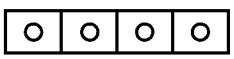
OPERATION PERIOD DURING GAME: 
PRESENTATION DATA: 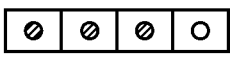
⊘:PERFORMANCE FLAG DATA ON
○:PERFORMANCE FLAG DATA OFF NON-TRANSITORY STORAGE MEDIUM ENCODED WITH COMPUTER READABLE MUSIC GAME PROGRAM WITH WHICH, IN PLAYING MULTIPLAYER GAME THROUGH COMMUNICATION, UNCOMFORTABLENESS DUE TO INFLUENCE SUCH AS DELAY IN COMMUNICATION IS SUPPRESSED AND OPERATION IS PERFORMED IN MORE REAL-TIME PERFORMANCE ENVIRONMENT, GAME DEVICE, METHOD OF CONTROLLING GAME DEVICE, AND GAME SYSTEM This nonprovisional application is based on Japanese Patent Application No. 2013-022185 filed with the Japan Patent Office on Feb. 7, 2013, the entire contents of which are hereby incorporated by reference.

FIELD

The present disclosure relates to a non-transitory storage medium encoded with a computer readable music game program, a game device, a method of controlling a game device, and a game system, and relates to a non-transitory storage medium encoded with a computer readable music game program capable of performing one game process with a plurality of users (players) using their respective game devices, a game device, a method of controlling a game device, and a game system.

BACKGROUND AND SUMMARY

An ensemble game system with which sound of a player's own part is output in accordance with a performance operation by a player while sounds of other parts are output with the use of performance data of other parts stored in a storage device has conventionally been disclosed.

In a game system for playing a multiplayer game in which one game is played by a plurality of users (players) using their respective game devices, data representing results of operations in another game device is received by a game device of a player himself/herself and the results of operations can be reflected on the game device of the player himself/herself. Here, however, due to delay in communication, reflection of the results of operations may be delayed. Therefore, for example, in a case of an ensemble game, because of delay in communication, sounds cannot be output in the game device of the player himself/herself immediately after operations in another game device, which has made the player feel uncomfortable during performance operations.

The present disclosure was made to solve the problems as described above, and an object thereof is to provide a non-transitory storage medium encoded with a computer readable music game program with which, in playing a multiplayer game through communication, uncomfortableness due to influence such as delay in communication is suppressed and an operation is performed in a more real-time performance environment, a game device, a method of controlling a game device, and a game system.

An exemplary embodiment provides a non-transitory storage medium encoded with a computer readable music game program executable by one or more processors of a game device performing a game process which proceeds in accordance with a prescribed presentation procedure for music data. The music game program causes the one or more processors to perform including a communication unit configured to obtain from another game device through communication, data relating to operation input to another game device, a presentation data generation unit configured to generate presentation data in accordance with the operation input to the game device, an estimated presentation data generation unit configured to estimate, based on the data relating to the operation input to another game device for a first portion of the music data obtained through the communication unit, presentation in accordance with the operation input to another game device for a second portion of the music data and generate estimated presentation data representing the presentation, and a game processing unit configured to perform the game process based on the presentation data in accordance with the operation input to the game device for the second portion and the estimated presentation data.

In the exemplary embodiment, the estimated presentation data generation unit may estimate, based on the data relating to the operation input to another game device for the first portion of the music data obtained through the communication unit, the presentation in accordance with the operation input to another game device for the second portion of the music data which has not yet been obtained through the communication unit and generate the estimated presentation data representing the presentation.

In the exemplary embodiment, the data relating to the operation input to another game device may include evaluation information indicating evaluation as compared with the presentation procedure, based on the operation input to another game device for a reference of the first portion of the music data.

In the exemplary embodiment, the estimated presentation data generation unit may estimate, based on the evaluation information to another game device for the first portion of the music data obtained through the communication unit, the presentation in accordance with the operation input to another game device for the second portion of the music data not obtained through the communication portion and generate the estimated presentation data representing the presentation.

In the exemplary embodiment, the estimated presentation data generation unit may estimate, based on the data relating to the operation input to another game device for the first portion corresponding to at least one section divided for each prescribed unit of the music data obtained through the communication unit, the presentation in accordance with the operation input to another game device for the second portion of the music data and generate the estimated presentation data representing the presentation.

In the exemplary embodiment, the estimated presentation data generation unit may determine whether or not a plurality of element patterns constituting the first portion of the music data are the same as a plurality of element patterns constituting the second portion of the music data, and estimate, in accordance with results of determination, based on the data relating to the operation input to another game device corresponding to each of the plurality of element patterns constituting the first portion of the music data obtained through the communication unit, the presentation in accordance with the operation input to another game device for the second portion of the music data and generate the estimated presentation data representing the presentation.

In the exemplary embodiment, the estimated presentation data generation unit may determine whether or not an element pattern constituting the first portion of the music data is the same as an element pattern constituting the second portion of the music data, and estimate, in accordance with results of determination, based on a length of the operation input to another game device for the element pattern constituting the first portion of the music data obtained through the communication unit, presence or absence of the presentation in accordance with the operation input to another game device for the element pattern constituting the second portion of the music data and generate the estimated presentation data representing the presentation.

In the exemplary embodiment, the estimated presentation data generation unit may determine whether or not a plurality of element patterns constituting the first portion of the music data are the same as a plurality of element patterns constituting the second portion of the music data, and estimate, in accordance with results of determination, based on the data relating to the operation input to another game device for at least one of a length and the number of element patterns constituting the first portion of the music data obtained through the communication unit, the presentation in accordance with the operation input to another game device for the second portion of the music data and generate the estimated presentation data representing the presentation.

In the exemplary embodiment, the element pattern may be data relating to a type of a note.

In the exemplary embodiment, the presentation data generation unit may generate at least one of the presentation data in accordance with the operation input to the game device and the presentation data in accordance with the operation input to another game device.

In the exemplary embodiment, the estimated presentation data generation unit may determine difference between timing when the operation input to the game device for the first portion of the music data is obtained and timing when the operation input to another game device for the first portion of the music data is obtained through the communication unit and may not estimate, in accordance with results of determination, the presentation in accordance with the operation input to another game device for the second portion of the music data based on the data relating to the operation input to another game device for the first portion of the music data obtained through the communication unit, and the game processing unit may perform the game process based on the presentation data in accordance with the operation input to the game device and another game device for the second portion when the estimated presentation data is not generated.

In the exemplary embodiment, the estimated presentation data generation unit may determine whether or not the second portion of the music data is a prescribed portion and may not estimate the presentation, in accordance with the operation input to another game device for the second portion of the music data, based on the data relating to the operation input to another game device for the first portion of the music data obtained through the communication unit, when the second portion of the music data is determined as the prescribed portion, and the game processing unit may perform the game process based on presentation data in accordance with the operation input to the game device and another game device for the second portion when the estimated presentation data is not generated.

An exemplary embodiment provides a game device performing a game process which proceeds in accordance with a prescribed presentation procedure for music data, which includes a communication unit obtaining from another game device through communication, data relating to operation input to another game device, a presentation data generation unit generating presentation data in accordance with the operation input to the game device, an estimated presentation data generation unit estimating, based on data relating to the operation input to another game device for a first portion of the music data obtained through the communication unit, presentation in accordance with the operation input to another game device for a second portion of the music data and generating estimated presentation data representing the presentation, and a game processing unit performing the game process based on the presentation data in accordance with the operation input to the game device for the second portion and the estimated presentation data.

An exemplary embodiment provides a method of controlling a game device performing a game process which proceeds in accordance with a prescribed presentation procedure for music data, including the steps of obtaining from another game device through communication, data relating to operation input to another game device, generating presentation data in accordance with the operation input to the game device, estimating, based on data relating to the operation input to another game device for a first portion of the music data obtained through communication, presentation in accordance with the operation input to another game device for a second portion of the music data and generating estimated presentation data representing the presentation, and performing the game process based on the presentation data in accordance with the operation input to the game device for the second portion and the estimated presentation data.

An exemplary embodiment provides a game system having a game device performing a game process which proceeds in accordance with a prescribed presentation procedure for music data, which includes a communication unit obtaining from another game device through communication, data relating to operation input to another game device, a presentation data generation unit generating presentation data in accordance with the operation input to the game device, an estimated presentation data generation unit estimating, based on data relating to the operation input to another game device for a first portion of the music data obtained through the communication unit, presentation in accordance with the operation input to another game device for a second portion of the music data and generating estimated presentation data representing the presentation, and a game processing unit performing the game process based on the presentation data in accordance with the operation input to the game device for the second portion and the estimated presentation data.

According to the exemplary embodiment, in playing a multiplayer game through communication, uncomfortableness due to influence such as delay in communication can be suppressed and an operation can be performed in a more real-time performance environment.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 19 shows an exemplary illustrative non-limiting diagram illustrating performance flag data in accordance with a type of note data according to the exemplary embodiment.

FIG. 20 shows an exemplary illustrative non-limiting diagram illustrating relation between an operation period for performance during a game and performance flag data according to the exemplary embodiment.

DETAILED DESCRIPTION OF NON-LIMITING EXAMPLE EMBODIMENTS

<1. Overall Configuration>

Figure 1:
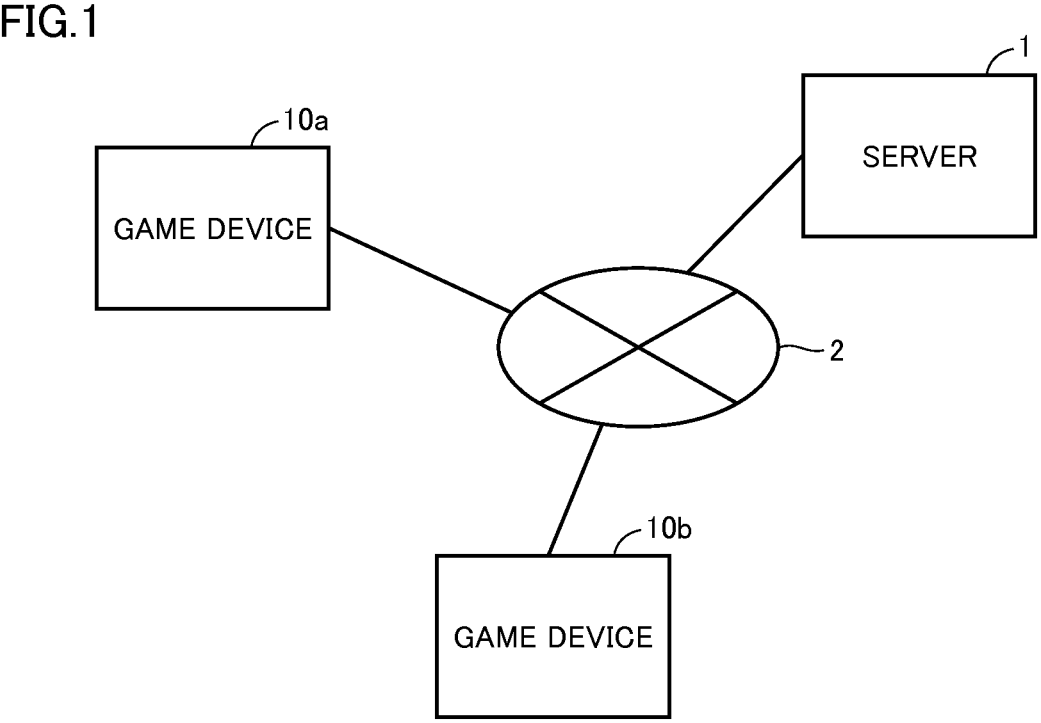
FIG. 1 shows an exemplary illustrative non-limiting block diagram showing a configuration of a game system according to an exemplary embodiment.

FIG. 1 is a block diagram showing a configuration of a game system according to the present embodiment.

Referring to FIG. 1, the present game system is configured such that a server 1 and a plurality of portable game devices (hereinafter simply referred to as a "game device") 10a, 10b are connected through a network 2 such as the Internet.

In the present embodiment, the game system includes a plurality of (two in the present example) game devices 10a to 10b. Though FIG. 1 shows a case that each of two players uses one game device and plays a game, any plurality of game devices may be included in the game system.

Game devices 10a, 10b can establish wireless connection to network 2, however, they may establish wired connection thereto. In addition, each game device may be a stationary game device instead of a portable game device. For example, a configuration may be such that a portable game device is connected to a stationary game device and the stationary game device is connected to the network, and in this case, a plurality of portable game devices may be connected to the stationary game device.

When game devices included in the game system do not particularly have to be distinguished from each other, one game device will hereinafter simply be denoted as game device 10.

Server 1 is an apparatus for determining (matching) a group of game devices playing a communication game. In another embodiment, the game system may be configured not to include server 1. Details of an operation of server 1 will be described later.

<Configuration of Game Device>

Figure 2:
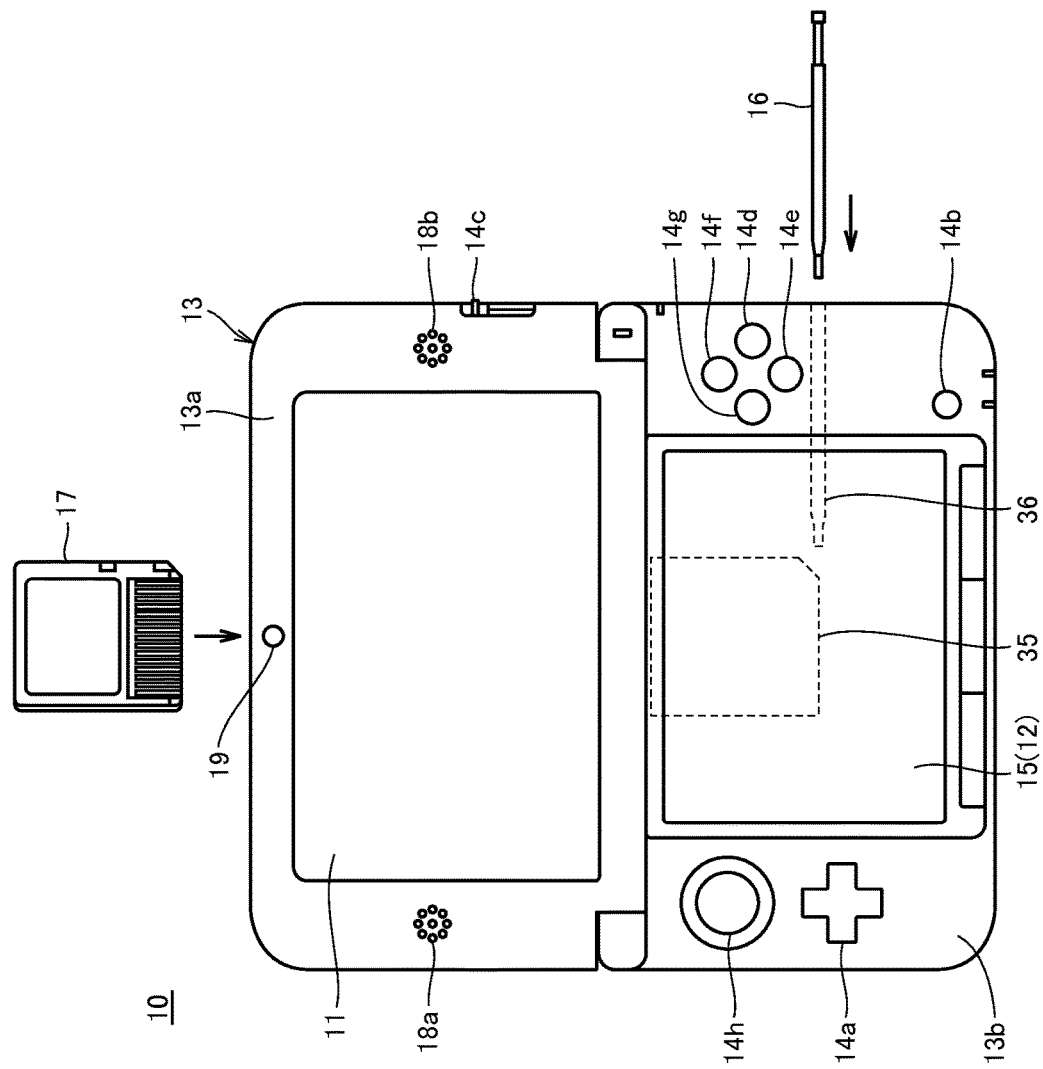
FIG. 2 shows an exemplary illustrative non-limiting external view of a game device 10 included in the game system according to the exemplary embodiment.

FIG. 2 is an external view of game device 10 included in the game system according to the present embodiment. In the present embodiment, game devices included in the game system are all configured similarly by way of example, and they are all configured as shown in FIG. 2.

Referring to FIG. 2, game device 10 includes an upper LCD (Liquid Crystal Display) 11 and a lower LCD 12. A housing 13 is constituted of an upper housing 13a and a lower housing 13b.

Upper LCD 11 is accommodated in upper housing 13a and lower LCD 12 is accommodated in lower housing 13b. Resolution of upper LCD 11 and lower LCD 12 is 256 dots×192 dots by way of example.

Though an LCD is employed as a display in the present embodiment, any other display such as a display making use of EL (Electro Luminescence) can also be made use of. In addition, a display of any resolution can also be made use of.

Upper housing 13a has sound emission holes 18a and 18b formed for emitting to the outside, sound from a pair of speakers (18 in FIG. 3) which will be described later.

In lower housing 13b, operation switches such as a cross-shaped key 14a, a start switch 14b, an A button 14d, a B button 14e, an X button 14f, a Y button 14g, a slide pad 14h, and the like are provided as input devices. In addition, an L button and an R button which are not shown are provided on a side surface of lower housing 13b. Moreover, a touch panel 15 is attached onto a screen of lower LCD 12 as an input device separate from each operation switch.

Three-D control switch 14c is a slide switch and it is a switch used for switching a display mode of upper LCD 11 as described above. Three-D control switch 14c is used for controlling a stereoscopic effect of a stereoscopic image displayed on upper LCD 11.

Slide pad 14h is a device indicating a direction. Slide pad 14h is constructed such that its key top slides in parallel to an inner surface of lower housing 13b. Slide pad 14h functions in accordance with a program executed by game device 10. In the present example, a direction may be input instead of cross-shaped key 14a.

An insertion port 35 (a dotted line shown in FIG. 2) for accommodating a memory card 17 and an insertion port 36 (a dotted line shown in FIG. 2) for accommodating a stick 16 are provided in side surfaces of lower housing 13b.

Touch panel 15 is a resistive touch panel. It is noted that the present embodiment is not limited to the resistive type and any pressing touch panel can be employed. Touch panel 15 can also be operated with fingers without limited to stick 16.

In the present embodiment, a touch panel having resolution (detection accuracy) of 256 dots×192 dots which is the same as the resolution of lower LCD 12 is made use of as touch panel 15. It is noted that resolution of touch panel 15 does not necessarily have to be equal to resolution of lower LCD 12.

It is noted that, in the present embodiment, at least one operation switch or touch panel 15 should only be provided as operation input to game device 10.

Memory card 17 is a recording medium recording a game program and it is removably attached to insertion port 35 provided in lower housing 13b. It is noted that a game program may be stored in an internal memory of a game device (which is preferably non-volatile, however, may be volatile), and a program downloaded from a prescribed server (or another game device) may be stored in the internal memory.

An internal configuration of game device 10 will now be described.

Figure 3:
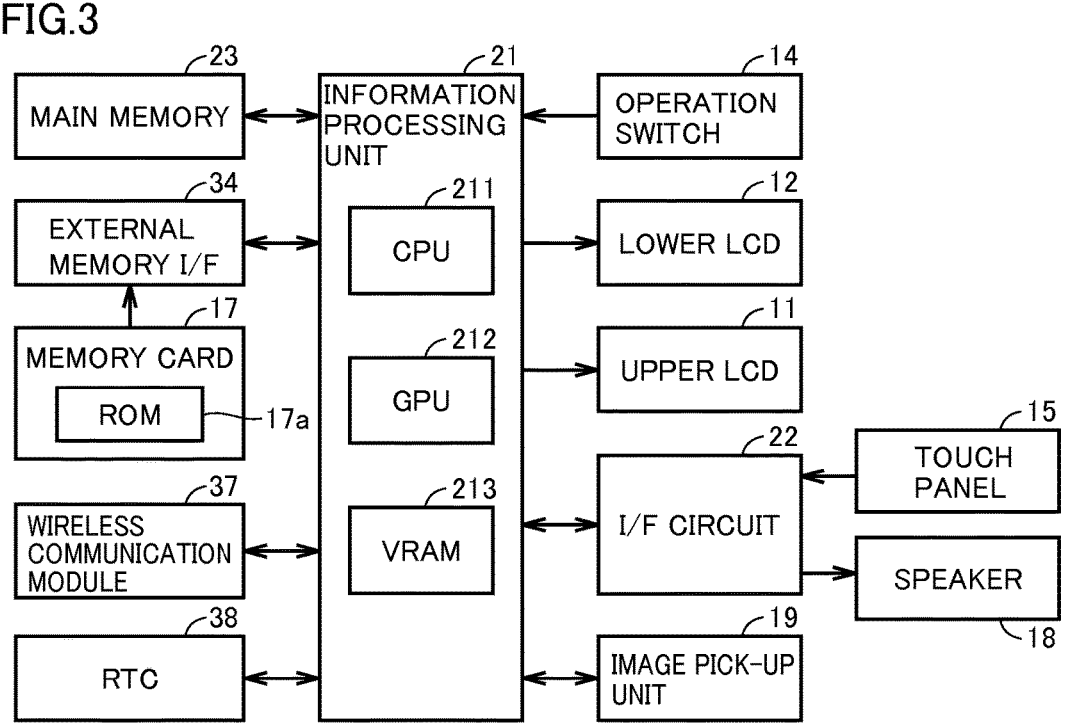
FIG. 3 shows an exemplary illustrative non-limiting block diagram showing an internal configuration of game device 10 according to the exemplary embodiment.

FIG. 3 is a block diagram showing the internal configuration of game device 10 according to the present embodiment.

Referring to FIG. 3, game device 10 includes, in addition to each component described above, electronic components such as an information processing unit 21, a main memory 23, an external memory interface (external memory I/F) 34, a wireless communication module 37, a real time clock (RTC) 38, and the like. These electronic components are mounted on an electronic circuit board and accommodated in lower housing 13b (or upper housing 13a).

Information processing unit 21 is information processing means including a CPU (Central Processing Unit) 211 for executing a prescribed program, a GPU (Graphics Processing Unit) 212 for image processing, and the like.

CPU 211 of information processing unit 21 performs processing in accordance with a program stored in a memory within game device 10 (such as a ROM (Read Only Memory) 17a of memory card 17 connected to external memory I/F 34), by executing the program. It is noted that a program executed by CPU 211 of information processing unit 21 may be obtained from other equipment through communication with other equipment. In addition, information processing unit 21 includes a VRAM (Video Random Access Memory) 213. GPU 212 of information processing unit 21 generates an image in response to a command from CPU 211 of information processing unit 21 and renders the image on VRAM 213. Then, GPU 212 of information processing unit 21 outputs the image rendered on VRAM 213 to upper LCD 11 and/or lower LCD 12, so that the image is displayed on upper LCD 11 and/or lower LCD 12.

Main memory 23 and external memory I/F 34 are connected to information processing unit 21. External memory I/F 34 is an interface for removable connection of memory card 17.

Main memory 23 is volatile storage means used as a work area or a buffer area of (CPU 211 of) information processing unit 21. Namely, main memory 23 temporarily stores various types of data used for processing based on the program or temporarily stores a program obtained from the outside (memory card 17, other equipment, or the like). In the present embodiment, for example, a PSRAM (Pseudo-SRAM) is employed as main memory 23.

Memory card 17 is non-volatile storage means for storing a program executed by information processing unit 21. Memory card 17 is implemented, for example, by a read only semiconductor memory. When memory card 17 is connected to external memory I/F 34, information processing unit 21 can read a program stored in ROM 17a of memory card 17. As information processing unit 21 executes a read program, prescribed processing is performed.

Though a program executed by memory card 17 is described in the present example, limitation thereto is not particularly intended, and an internal memory implemented by a readable and writable non-volatile memory (such as a NAND-type flash memory) and used for storing prescribed data may be included. For example, the internal memory may store data or a program downloaded through wireless communication via wireless communication module 37.

Wireless communication module 37 has a function to connect to wireless LAN (Local Area Network), for example, in conformity with the specifications defined under IEEE802.11b/g. Wireless communication module 37 is connected to information processing unit 21. Information processing unit 21 can transmit and receive data to and from other equipment through the Internet by means of wireless communication module 37.

RTC 38 is connected to information processing unit 21. RTC 38 counts time and outputs the time to information processing unit 21. Information processing unit 21 calculates the current time (date) based on the time counted by RTC 38.

In addition, an acceleration sensor which is one type of a not-shown inertia sensor may be connected to information processing unit 21 so that it receives position data (acceleration data) indicating acceleration sensed by the acceleration sensor and a position of game device 10 is sensed. Then, the position data can also serve as operation input to game device 10.

Though an example of an input device provided on a main body side of game device 10 is described as operation input to game device 10 in the present example, the input device does not particularly have to integrally be provided. Specifically, an input device may be provided as a separate component (for example, a remote controller or the like) and it may be provided to be able to communicate with information processing unit 21 through wireless or wired connection. Then, a configuration may be such that an acceleration sensor is provided in a remote controller provided as a separate component and position data sensed by the acceleration sensor is output to information processing unit 21 as operation input to game device 10.

In addition, an image pick-up unit 19 is connected to information processing unit 21. Image pick-up unit 19 picks up an image in response to an instruction from information processing unit 21 and outputs data of the picked up image to information processing unit 21.

Image pick-up unit 19 includes an image pick-up element having prescribed resolution (such as a CCD image sensor and a CMOS image sensor) and a lens. The lens may have a zoom mechanism.

An I/F circuit 22 is connected to information processing unit 21. A speaker 18 is connected to I/F circuit 22.

Specifically, speaker 18 is connected to I/F circuit 22 through a not-shown amplifier. The amplifier amplifies an audio signal from I/F circuit 22 and causes voice and sound to be output from speaker 18.

Touch panel 15 described above is also connected to I/F circuit 22. I/F circuit 22 includes an audio control circuit for control of speaker 18 (amplifier) and a touch panel control circuit for control of the touch panel. The audio control circuit carries out A/D conversion and D/A conversion of an audio signal or conversion of an audio signal to audio data in a prescribed format. The touch panel control circuit generates touch position data in a prescribed format based on a signal from touch panel 15 and outputs the data to information processing unit 21. Touch position data indicates a coordinate of a position where input has been given onto an input surface of touch panel 15.

Operation switch 14 is constituted of the switches, the slide pad, buttons 14*d* to 14*g*, or the like, and connected to information processing unit 21.

Operation data indicating an input status of the switches, the slide pad, buttons 14*d* to 14*g*, or the like (whether or not pressing has been carried out) is output from operation switch 14 to information processing unit 21. Information processing unit 21 performs processing in accordance with input to the switches, the slide pad, buttons 14*d* to 14*g*, or the like by obtaining operation data from operation switch 14.

It is noted that CPU 211 obtains operation data from operation switch 14 once in a prescribed time period.

Lower LCD 12 and upper LCD 11 are connected to information processing unit 21. Lower LCD 12 and upper LCD 11 display an image in response to an instruction from (GPU 212 of) information processing unit 21.

2. Operation Outlines of Game System

Outlines of an operation performed in the game system will now be described.

In the present embodiment, a case that an ensemble game is played by a plurality of game devices with which a player is caused to give a performance will be described by way of example.

In this ensemble game, a plurality of players play, and enjoy performance of, each part of a music including a plurality of parts. Namely, it is assumed that one part of a music is allocated to each player and the player plays the allocated part with the use of a game device. It is noted that a plurality of players may be allowed to play the same part.

Contents of performance by each player are transmitted to another game device and the game device obtains the contents of performance in all game devices. The game device uses the obtained contents of performance and outputs sounds of all parts together, that is, outputs performance sounds in ensemble.

The ensemble game described in the present example is for performance in ensemble by a plurality of players by outputting performance in each game device together in ensemble through the processing above.

Initially, a performance operation using the game device will be described. During a period in which a music can be played (a performance period), in response to a player performing an operation to press any prescribed performance button, the game device outputs sound of a player part.

In the present embodiment, it is assumed that 10 types of buttons consisting of up, down, left, and right buttons of cross-shaped key 14*a*, A button 14*d*, B button 14*e*, X button 14*f*, Y button 14*g*, the L button, and the R button are allocated as performance buttons. It is noted that slide pad 14*h* may be employed instead of cross-shaped key 14*a*.

The player part of the game device refers to a part allocated to that game device. In addition, another part of the game device refers to a part allocated to automatic performance or another game device. It is noted that a part allocated to another game device is also referred to as another player part. In addition, in the present embodiment, sound of a different interval is output in accordance with a type of a pressed key.

Specifically, for example, 8 intervals of scales are allocated to 8 types of buttons of the up, down, left, and right buttons of cross-shaped key 14*a* and buttons 14*d* to 14*g*, respectively, and the interval changes by half step with the L button and the interval changes by one octave with the R button. As above, a player can play a player part by using 10 types of performance buttons.

A tone changes in accordance with a part allocated to the game device of the player himself/herself. Namely, a game device stores sound data for each musical instrument and for each tone.

Specifically, for example, during performance of a music including parts of a piano and a guitar, sound data of the piano is used in a game device to which a piano part has been allocated and sound data for the guitar is used in a game device to which a guitar part has been allocated.

Though a fixed interval has been allocated to each performance button operation in the present embodiment, sound of a different interval may be output in accordance with a music and/or a certain part even in one music even though the same performance button is operated. In this case, data designating an interval output at the time when a certain performance button is operated is defined for each music (and/or each portion in a music), and each game device stores the defined data, which is made use of during play of an ensemble game.

In addition, in the present embodiment, correct timing at which a performance button should be operated is defined for each music, and game device 10 determines whether or not the timing of operation of a performance button is within an allowable range with the correct timing serving as the reference.

In this case, regardless of whether or not the timing is within the allowable range with the correct timing serving as the reference, sounds may be output whenever a performance button may be operated, or sound may be output only when a button is operated at the timing within the allowable range with the correct timing serving as the reference.

In the present embodiment, a correct performance button to be operated which is associated with correct timing, at which a performance button should be performed, is defined for each music, and game device 10 determines whether or not an operation of the performance button is the correct performance button.

In this case, corresponding sound may be output only when the correct performance button is operated, and corresponding sound may be output regardless of whether or not a correct performance button has been operated.

In an ensemble game described in the present example, during a performance period when a performance operation is allowed, an image for an instruction for a performance operation of a music to be played is displayed on a screen of game device 10. Here, an image for an instruction for a performance operation indicates to a player, correct timing to operate a performance button (and additionally a type of a correct performance button to be operated).

The player performs a performance operation in accordance with contents displayed on the screen.

Figure 4:
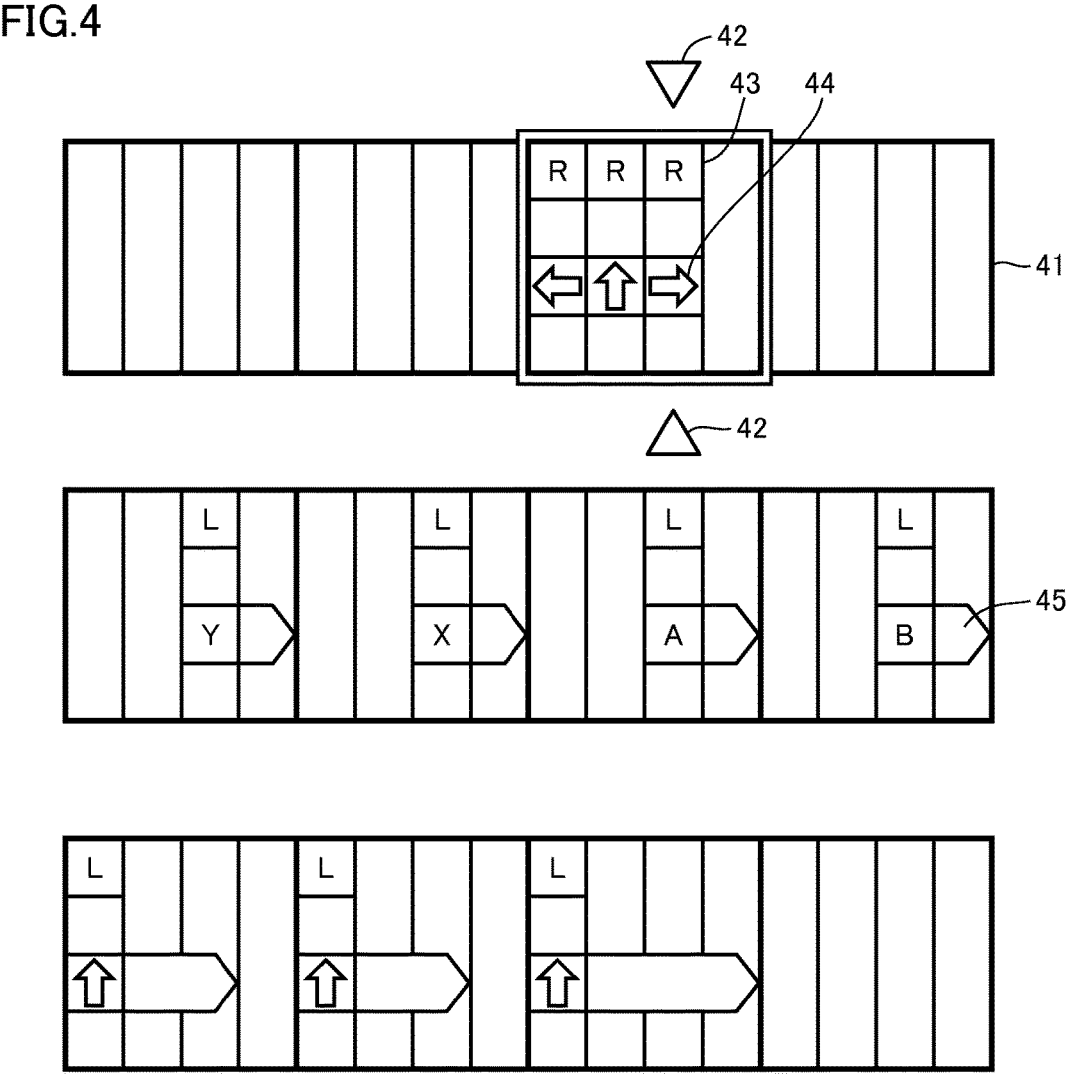
FIG. 4 shows an exemplary illustrative non-limiting diagram showing an example of a game image displayed on a screen of the game device according to the exemplary embodiment.

FIG. 4 is a diagram showing an example of a game image displayed on the screen of the game device according to the present embodiment.

Referring to FIG. 4, on the screen of upper LCD 11 or lower LCD 12, three gauges (such as a gauge 41), a pair of cursors 42, a plurality of operation instruction images for an operation of performance buttons (such as operation instruction images 43 and 44), and an operation period image indicating timing or a length of an operation of a performance button (such as an operation period image 45) are displayed. The game image shown in FIG. 4 is an image for indicating to a player, correct timing for an operation for performance of a player part (and additionally a type of a correct performance button to be operated).

A plurality of gauges in a horizontally long shape are arranged in a vertical direction. In addition, the gauge is provided with a scale divided in sections for a prescribed unit. One gauge is divided, for example, into 16 sections in the case of four-four time, and divided, for example, into 12 sections in the case of three-four time. For example, in the case of the four-four time, 4 sections is equal to 1 beat, and 16 sections is equal to one bar.

A pair of cursors 42 is arranged at the same position with respect to a horizontal direction; one is arranged above any gauge and the other is arranged below the gauge. An operation instruction image and an operation period image are arranged on the gauge. The operation instruction image includes an image indicating any of the 10 types of performance buttons (arrows in the up, down, left, and right directions, or characters of A, B, X, Y, L, R). The operation period image is arranged as necessary on the right of the operation instruction image.

Since a part allocated to each game device included in the game system is different, an operation instruction image and an operation period image are arranged at different positions for each game device on the screen of each game device. It is noted that, even though an operation instruction image for a performance button operation is different from a form adopted in the present embodiment, a person skilled in the art could readily understand that various forms can be adopted. For example, each instruction image for a performance operation (an operation instruction image and an operation period image) may be in such a form that a cursor indicating correct timing to operate is provided in something like a general musical score, or may be in such a form that the operation instruction image is moved toward a prescribed position for display and correct timing to operates comes when the operation instruction image reaches the prescribed position.

As the performance period starts, a pair of cursors 42 moves over time from the left to the right of the gauge, and when it reaches the right end of the gauge, it moves to the left end of a gauge displayed directly under that gauge. In addition, the gauge displayed on the screen scrolls upward with movement of cursor 42 such that cursor 42 is constantly displayed in the screen. Namely, each gauge moves upward and a new gauge having an operation instruction image and an operation period image arranged is additionally displayed from a lower side of the screen.

A gauge having each instruction image (an operation instruction image and an operation period image) arranged corresponds to a performance operation instruction, that is, a musical score, and it represents timing and a length to press a performance button and a type of a performance button to be pressed. Specifically, a player operates a performance button represented by the operation instruction image at timing at which the operation instruction image is designated by cursor 42 (timing when the operation instruction image is located between a pair of cursors 42).

For example, at the time point when an image shown in FIG. 4 is displayed, since cursor 42 designates operation instruction image 43 representing the R button and operation instruction image 44 representing the right direction of cross-shaped key 14a, the player performs an operation to simultaneously press R button 14 and the right direction of cross-shaped key 14a. In addition, the operation period image represents timing and a length to press a performance button. Namely, the player continuously presses the performance button while moving cursor 42 designates the operation period image. For example, operation period image 45 shown in FIG. 4 represents continuous pressing of B button 14e for a time period indicated by two scale markings.

In representing pressing of a certain performance button for a relatively short time period (such as a time period indicated by one scale marking), the operation period image does not have to be arranged. By pressing a performance button in accordance with each instruction image arranged on the gauge, the player can correctly play a music.

By performing the performance operation described above, the player can play a player part. Here, for ensemble, data representing contents of performance of another part allocated to another game device should successively be obtained during performance, and sounds of another part should be output during performance based on the obtained data.

In receiving data from another game device, however, delay in communication may occur in particular in the case of communication through a network. Therefore, timing to output sounds of another part may be delayed as compared with timing to output sounds of the player part. In addition, in a case of local communication not via a network as well, delay may also occur depending on an environment. In a case of ensemble, sounds of the player part and sounds of another part should be in synchronization with each other. When such delay occurs, however, sounds of the player part and sounds of another part cannot be output in synchronization with each other.

Then, in the present embodiment, based on data obtained from another game device of a player who plays another part (operation input to a first portion), data for outputting sounds for another portion (a second portion) of another part is estimated as necessary. Namely, estimation data obtained by estimating operation input to another game device for the second portion of another part is generated. Then, sounds of another part are output based on the estimation data. Thus, at the timing to output sounds of the player part, since sounds of another part are output based on the estimation data, performance by a player and performance by another player can be output without uncomfortableness, with the problem of operability due to delay being suppressed. In addition, since sounds of another part are data estimated in accordance with a status of performance operated in a real-time environment of the player who plays another part, a player who plays together with the player playing another part can perform an operation in a more real-time environment.

It is noted that obtainment of data from another game device in the present embodiment includes not only a case that transmitted data is received real-time but also a case that data was received in the past. In addition, it is a concept encompassing also a case that received data is processed for easy processing and it is accepted as processed data.

An operation in the game system will now be described.

Figure 5:
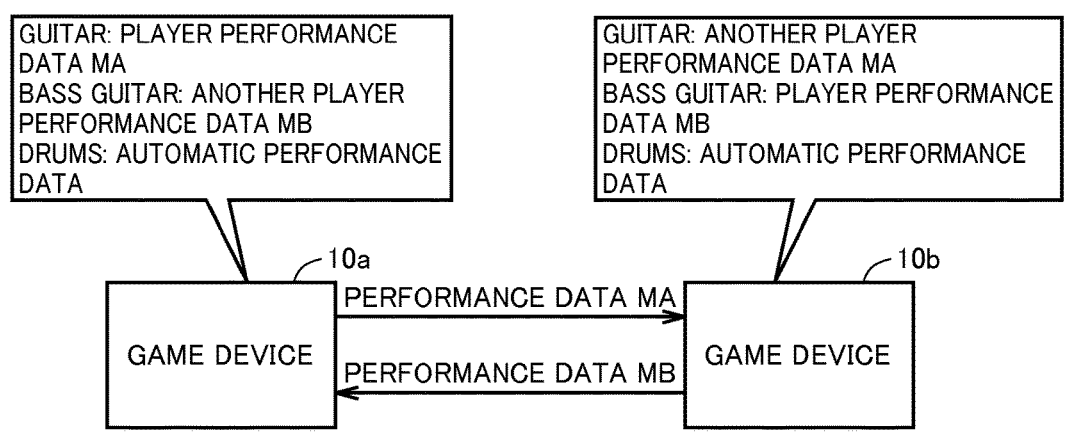
FIG. 5 shows an exemplary illustrative non-limiting diagram illustrating a case that a piece of music constituted of three parts of a guitar, a bass guitar, and drums is played in ensemble by two game devices 10a, 10b by way of example according to the exemplary embodiment.

FIG. 5 is a diagram illustrating a case that a music constituted of three parts of a guitar, a bass guitar, and drums according to the present embodiment is played in ensemble by two game devices 10a, 10b by way of example. It is noted that description will be given, assuming that a drum part is played as automatic performance data.

Referring to FIG. 5, specifically, it is assumed that a guitar part is allocated to game device 10a and a bass guitar part is allocated to game device 10b. Then, it is assumed that a drum part is automatically played.

It is noted that each of game device 10a and game device 10b is a game device to which a memory card storing a program for an ensemble game has been attached. By executing the program (or executing a program contained in a device main body), data desiring execution of the ensemble game is transmitted to a prescribed server (server 1 in FIG. 1) and a plurality of game devices desiring execution of the ensemble game are grouped in the server, so that a unit group which plays the ensemble game is formed.

It is noted that even a game device to which a memory card storing a program of an ensemble game is not attached can show its desire to play the ensemble game to the server. Specifically, it is realized in such a manner that data showing desire to play the ensemble game is transmitted to the server, a program for receiving distribution of the program for the ensemble game is contained in the game device main body, and the program is distributed from the server to the game device.

In addition, a plurality of game devices desiring execution of the ensemble game may be grouped through local communication not via a network. Specifically, connection information can be exchanged through local communication among a plurality of game devices to thereby form a unit group which plays the ensemble game. It is noted that even a game device to which a memory card storing a program of the ensemble game is not attached can play the ensemble game by receiving distribution of the program through local communication from the game device storing the program of the ensemble game.

For each of game device 10a and game device 10b which are game devices grouped as such, processing for determining a responsible part is performed before the ensemble game is started. This processing is performed, for example, with a method as will be described later with reference to step S4 in FIG. 7.

The part determined here is referred to during a performance period. In addition, in the grouped game devices, processing for selecting common music data is performed before the ensemble game starts. The music determined here is referred to during the performance period.

Then, each player performs an operation for performance of each part. Namely, each game device 10a, 10b outputs sounds of each player part in response to an operation by each player during the performance period. Here, processing different for each player part is performed in each game device.

Specifically, an operation instruction image for operating a performance button corresponding to a player part is displayed, sounds in accordance with an operation by the player are output, and sounds of another part are generated and output with the use of data obtained from another game device. Therefore, during the performance period, the player can enjoy play by the player himself/herself and ensemble in timing with play by another player. It is noted that, in the case that there is a part of automatic performance, sounds corresponding to that part are automatically generated and output together in the game device.

In the present embodiment, game device 10 transmits performance data representing contents of performance played for the player part to another game device during the performance period (see FIG. 5). Though the description will be given later, performance data representing performance contents of performance is transmitted as player data with other additional information necessary for transmission processing being added thereto. In addition, performance data representing performance contents in another game device transmitted from another game device is received as another player data.

In the present example, performance data MA representing contents of performance performed in game device 10a is transmitted to game device 10b, and performance data MB representing contents of performance performed in game device 10b is transmitted to game device 10a. Thus, game device 10 can obtain performance data representing performance contents in performance by another game device.

Thus, in game device 10a, sounds in accordance with performance data MA in response to an operation by the player are output for the guitar part. In addition, sounds in accordance with performance data MB in response to an operation by another player obtained from another game device (game device 10b) are output for the bass guitar part. Moreover, sounds in accordance with automatic performance data are output for the drum part. In game device 10b, sounds in accordance with performance data MA of another player obtained from another game device (game device 10a) are output for the guitar part. Furthermore, sounds in accordance with performance data MB in response to an operation by the player are output for the bass guitar part. In addition, sounds in accordance with automatic performance data are output for the drum part.

As above, according to the present embodiment, the player is caused to give a performance. Then, during performance, sounds of the player part are output in response to an operation by the player and sounds of another part are output by using already obtained performance data. Therefore, during performance, performance by another player and/or automatic performance can be output together with the player's own performance. Thus, the ensemble game in which sounds of all parts are played in ensemble in timing can be executed.

3. Data in Game Process

The game process performed in game device 10 in the present embodiment will now be described.

Figure 6:
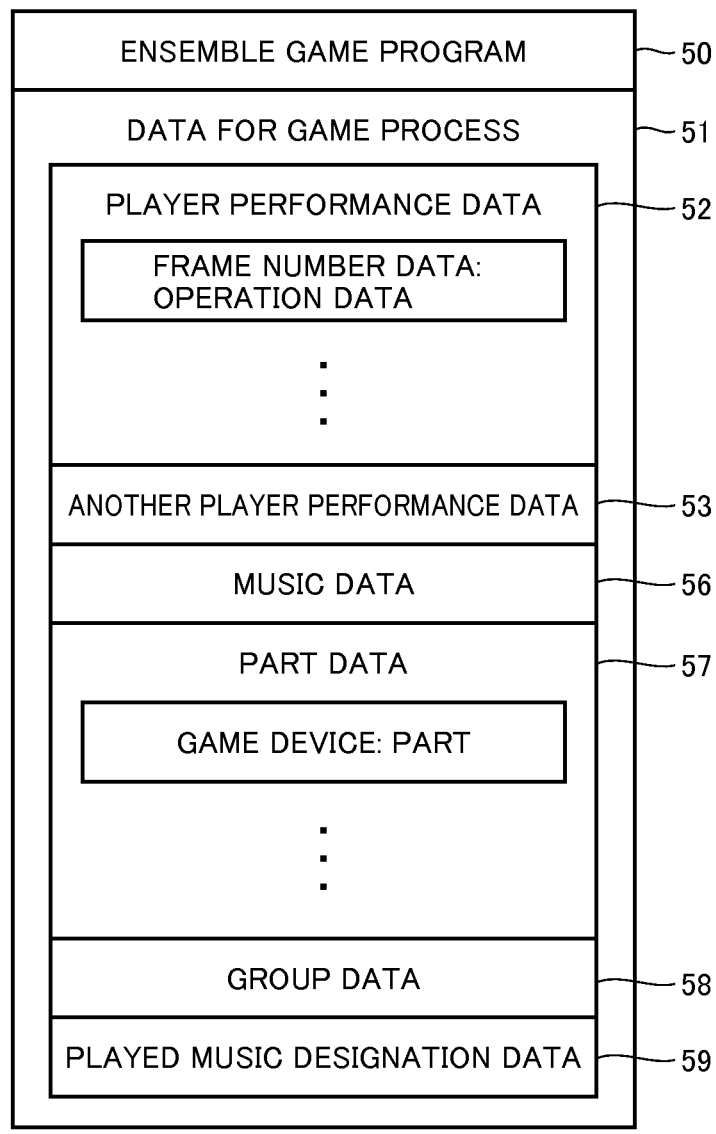
FIG. 6 shows an exemplary illustrative non-limiting diagram showing main data stored in a main memory 23 of game device 10 according to the exemplary embodiment.

FIG. 6 is a diagram showing main data stored in main memory 23 of game device 10 according to the present embodiment.

Referring to FIG. 6, main memory 23 stores an ensemble game program 50, data for game process 51, and the like. It is noted that main memory 23 stores, in addition to the data shown in FIG. 6, data necessary for the game process such as sound source data necessary for outputting performance sound of a music and image data of various objects which appear in a game.

Ensemble game program 50 is partly or entirely read from ROM 17a of memory card 17 at appropriate timing after power of game device 10 is turned on, and stored in main memory 23. Ensemble game program 50 is a program for CPU 211 to perform the game process (FIG. 7) for the ensemble game which will be described later.

Data for game process 51 includes various types of data used in performing the game process (FIG. 7) which will be described later. Specifically, data for game process 51 includes player performance data 52, another player performance data 53, music data 56, part data 57, group data 58, and played music designation data 59.

Player performance data 52, another player performance data 53, and part data 57 are data generated as the program is executed and stored in main memory 23, and music data 56 is data stored in main memory 23 as data stored in ROM 17a is read. It is noted that the data for game process includes, in addition to the data above, sound data for each interval for each part (musical instrument).

Player performance data 52 is performance data generated in a game device of a player himself/herself. Namely, player performance data 52 represents contents of performance of a part allocated to the game device of the player himself/herself (a player part). In the present embodiment, player performance data 52 includes operation data obtained from operation switch 14 at a frame time (1/60 [s] by way of example) interval (data indicating which performance button has been operated) and frame number data indicating a frame time at which the operation data was obtained.

It is noted that frame number data indicates a time point during a performance period, with a performance start time point being defined, for example, as a frame number 1 and then incremented.

Player performance data 52 includes a set of operation data and frame number data. Therefore, by referring to player performance data 52, game device 10 can know at which time point during the performance period which performance button has been pressed. It is noted that performance data may be configured not to include frame number data, and correct timing of performance can be specified by an index in a sequence, for example, of operation data for each frame, instead of the frame number.

Another player performance data 53 is performance data generated in another game device. Namely, another player performance data 53 represents contents of performance of a part allocated to another device (another part). In the present embodiment, likewise player performance data 52, another player performance data 53 includes a plurality of sets of operation data and frame number data. It is noted that, when two or more game devices play an ensemble game (that is, a plurality of other game devices which play in ensemble together are present), another player performance data 53 is stored for each device.

It is noted that, in the present embodiment, each piece of performance data 52, 53 includes data indicating a time point during a performance period (frame number data) and data indicating a performance operation performed by a player at that time point (operation data), and the operation data is changed to presentation data used for generation of part sound, although the description will be given later.

Here, each piece of performance data 52, 53 can specify contents of performance by a player, and any information capable of reproducing the contents of performance may be accepted. For example, in another embodiment, each piece of performance data 52, 53 may be data indicating correspondence between a frame number and sound to be output at the time corresponding to the frame number.

In addition, in another embodiment, operation data of each piece of operation data 52, 53 may be true/false data indicating evaluation information for evaluating an operation corresponding to a frame number and sound to be output at the time corresponding to the frame number (for example, "OK" when an appropriate operation is performed and "NG" when an inappropriate operation is performed). In addition, as the evaluation information, whether or not an amount of operation deviation from a correct performance button operation serving as the reference or an operation position is within an allowable range with a prescribed operation position serving as the reference can also be determined, and when it is out of the allowable range, an amount of position displacement from the prescribed operation position can also be included. For example, in such a form that an operation instruction image is moved toward a prescribed position and displayed and correct timing for an operation comes at the time when the operation instruction image reaches an operable cursor, when the operation instruction image matches with a central portion of the cursor, determination as a correct performance button operation may be made, and when the operation instruction image is displaced from the central portion, determination as an inappropriate performance button operation may be made, so that an amount of position displacement from the central position may be included.

Music data 56 is data including various types of data relating to a music such as a length of the music or the number of parts, as well as performance operation instruction information corresponding to notes of a musical score of musics and performance output information.

The performance operation instruction information is information indicating an operation for performance in correspondence with notes of a musical score of a music by way of example, and the performance output information is information relating to sound output in response to an operation for performance of notes of a musical score of a music.

Specifically, music data 56 includes as performance operation instruction information, frame number data and data indicating a performance button operation to be performed at the time corresponding to the frame number data (performance operation instruction data). In addition, music data 56 includes as performance output information, frame number data and data indicating correspondence with sound to be output in response to a performance button operation to be performed at the time corresponding to the frame number data (performance output data). It is noted that performance operation instruction data and performance output data are also collectively referred to as note data.

It is noted that performance output information may include data indicating an amount of deviation of an interval in accordance with an amount of deviation of a performance button operation or the like to be performed at the time corresponding to the frame number data. For example, it may include data on deviation in timing of a performance button operation (the number of frames) and deviation of a performance button operation (which performance button deviated from a correct performance button has been operated or the like).

Performance operation instruction information and performance output information are included for each part constituting a music. In addition, audio file data serving as BGM for output of sound in response to an operation by a player may also be stored. This data is used as performance output information.

It is noted that the operation instruction image and the operation period image described as the game image shown in FIG. 4 are displayed in accordance with the performance operation instruction information.

By using music data 56, game device 10 generates performance sound in response to an operation by a player, generates performance sound for a part other than a player part (another part), or determines arrangement of an instruction image displayed on the screen. It is noted that automatic performance for a part other than the player part may be reproduced by preparing audio file data for each part or sound may be output through program processing based on performance data obtained from another game device.

In addition, game device 10 may store music data for a plurality of musics. Alternatively, a music data storage area may be formed in a non-volatile memory (such as an internal memory) which can be made use of by each game device so that music data downloaded from a prescribed server (storing a plurality of pieces of music data) can be stored in the music data storage area. Furthermore, music data may be created based on input by a player in each game device and the created data may be stored in the music data storage area. In the case above, music data stored in each game device included in the game system may store music data of musics different from one another. Alternatively, created music data may be distributed to another game device and may be made use of also in another game device.

Part data 57 is data indicating correspondence with a game device and a part allocated thereto in play in ensemble. More specifically, part data 57 is data bringing identification information for a game device and identification information for a part in correspondence with each other. In addition, in the present embodiment, part data 57 indicates correspondence with a game device. It is noted that, for a portion where there is no correspondence between a part and a game device, the part can be processed as automatic performance or absence of performance as necessary.

Group data 58 indicates identification information of another game device belonging to a group the same as that for the game device of the player himself/herself. In addition, played music designation data 59 is data for identifying a music played by each player during performance (played music).

4. Details of Game Process

<4.1 Main Flow of Game Process>

Details of the game process performed in game device 10 will now be described.

Figure 7:
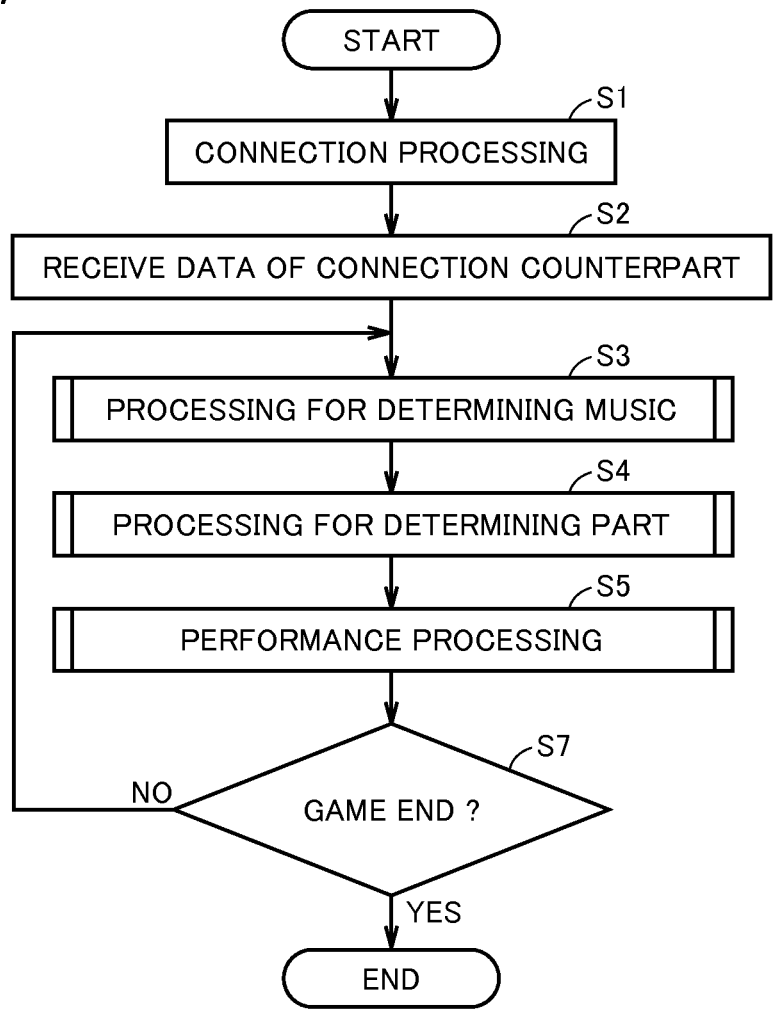
FIG. 7 shows an exemplary illustrative non-limiting flowchart showing a flow of a game process performed in game device 10 according to the exemplary embodiment.

FIG. 7 is a flowchart showing a flow of the game process performed in game device 10 according to the present embodiment.

Referring to FIG. 7, initially, when power of game device 10 is turned on, CPU 211 of game device 10 executes a start-up program stored in a not-shown boot ROM and each unit such as main memory 23 is initialized. Then, a game program stored in memory card 17 is read in main memory 23 and CPU 211 starts execution of the game program. The flowchart shown in FIG. 7 is a flowchart showing the game process performed after the processing above is completed.

Initially, in step S1, CPU 211 performs processing for connection to server 1. As described previously, server 1 performs matching processing, that is, processing for determining a group of game devices which play an ensemble game together. Namely, the processing in step S1 is processing that game device 10 requests server 1 to perform the matching processing. Specifically, CPU 211 transmits matching request data including information for identifying a game device of a player himself/herself (such as an IP address) to server 1 through wireless communication module 37.

In response to reception of the matching request data, server 1 selects a game device with which game device 10 plays an ensemble game as a connection counterpart, from among other game devices which similarly have transmitted the matching request data. It is noted that information for identifying a game program stored in memory card 17 (a game program ID) may be included in matching request data and transmitted to the server, and in this case, server 1 selects as a connection counterpart for game device 10, another game device which has transmitted matching request data including the same game program ID. It is noted that a game program ID is stored in memory card 17, together with a game program.

In the present embodiment, game device 10 can transmit number data indicating the number within a prescribed range as being included in matching request data. The number of pieces of number data is designated by a player. When server 1 receives matching request data including number data, it selects as a connection counterpart for game device 10, another game device which has transmitted matching request data including number data having the same number. The number data is effective, for example, when acquaintances would like to play an ensemble game together. Namely, by determining in advance the number in number data to be transmitted among acquaintances, server 1 matches game devices of the acquaintances, so that the acquaintances can play together the ensemble game.

It is noted that a matching method is not limited to the method using the number data above and a transmission method with data indicating some conditions being included in matching request data or a method that server 1 randomly selects a game device may be applicable. In the former case, for example, such a method is possible that data indicating a proficiency level in a game is transmitted as being included in matching request data and game devices equal in proficiency level are matched.

When a predetermined upper limit number of connection counterparts are selected or when a prescribed time period has elapsed since selection of a prescribed number of connection counterparts smaller than the upper limit value, server 1 ends the matching processing. Thus, a group consisting of game device 10 and game device(s) which is (are) selected connection counterpart(s) is formed. It is noted that, in a case of the ensemble game, the upper limit value is preferably set to the number of parts constituting a music. The prescribed number and the prescribed time period may be set by game device 10. When server 1 ends the matching processing, it transmits data identifying a game device of a connection counterpart to each game device in the group. In addition, in the present embodiment, in transmitting the data above, server 1 selects one game device in the group as a leader and notifies the selected game device of the fact that it is the leader.

In step S2, CPU 211 receives data indicating identification information of a connection counterpart from server 1 and registers (stores) the data in main memory 23 as group data 58. Thus, game device 10 is able to communicate with another game device included in the group. Subsequently, the game devices included in the group directly communicate with one another without via server 1. Though a plurality of game devices included in the game system are determined by using server 1 in the present embodiment, a method of determining a plurality of game devices included in the game system may be any method, and it may be a method not using server 1. In addition, even after matching, communication via server 1 may be carried out.

It is noted that the processing in steps S1 and S2 may be performed by a program contained in game device 10, instead of execution of a game program stored in memory card 17. By doing so, even a player not having memory card 17 can join the ensemble game. In this case, a game program is distributed from a server or another game device (typically, a matched game device) to that game device and then executed.

Though such a scheme as performing matching processing or the like for determining a group of game devices which play the ensemble game together through server/client communication is described in the present example by way of example, limitation to server/client communication is not intended, and processing the same as above may be performed by communicating with another game device through P2P communication not via the server. In that case, certain game device 10 should only perform processing similar to a function of the matching processing or the like of server 1 above. A program for performing the processing may be stored in an attached memory card or contained in a device main body in advance. It is noted that similar processing can be performed also through local communication not via the network, without being limited to P2P communication.

In step S3, CPU 211 performs processing for determining a music. The processing for determining a music is processing for determining a music played in the ensemble game.

Then, in step S4 following step S3, CPU 211 performs processing for determining a part. The processing for determining a part is processing for determining which part each game device in the group plays among parts constituting a music to be played which was determined in step S3.

Then, in step S5 following step S4, CPU 211 performs performance processing. The performance processing is processing for causing a player to give a performance.

Then, in step S7 following step S5, CPU 211 determines whether or not to end the ensemble game. Determination in step S7 is made based on whether or not an instruction to end the ensemble game has been given from a player, whether or not a prescribed number of times of ensemble was performed, or the like. When a result of determination in step S7 is negative (NO in step S7), the processing in step S3 is performed again. Here, a game device which is the leader may be changed. For example, the game device which is the leader may select a game device which should be a leader next from among other game devices in the group. On the other hand, when a result of determination in step S7 is positive (YES in step S7), CPU 211 ends the game process shown in FIG. 7.

<4.2 Flow of Processing for Determining Music>

Details of the processing for determining a music will now be described.

Figure 8:
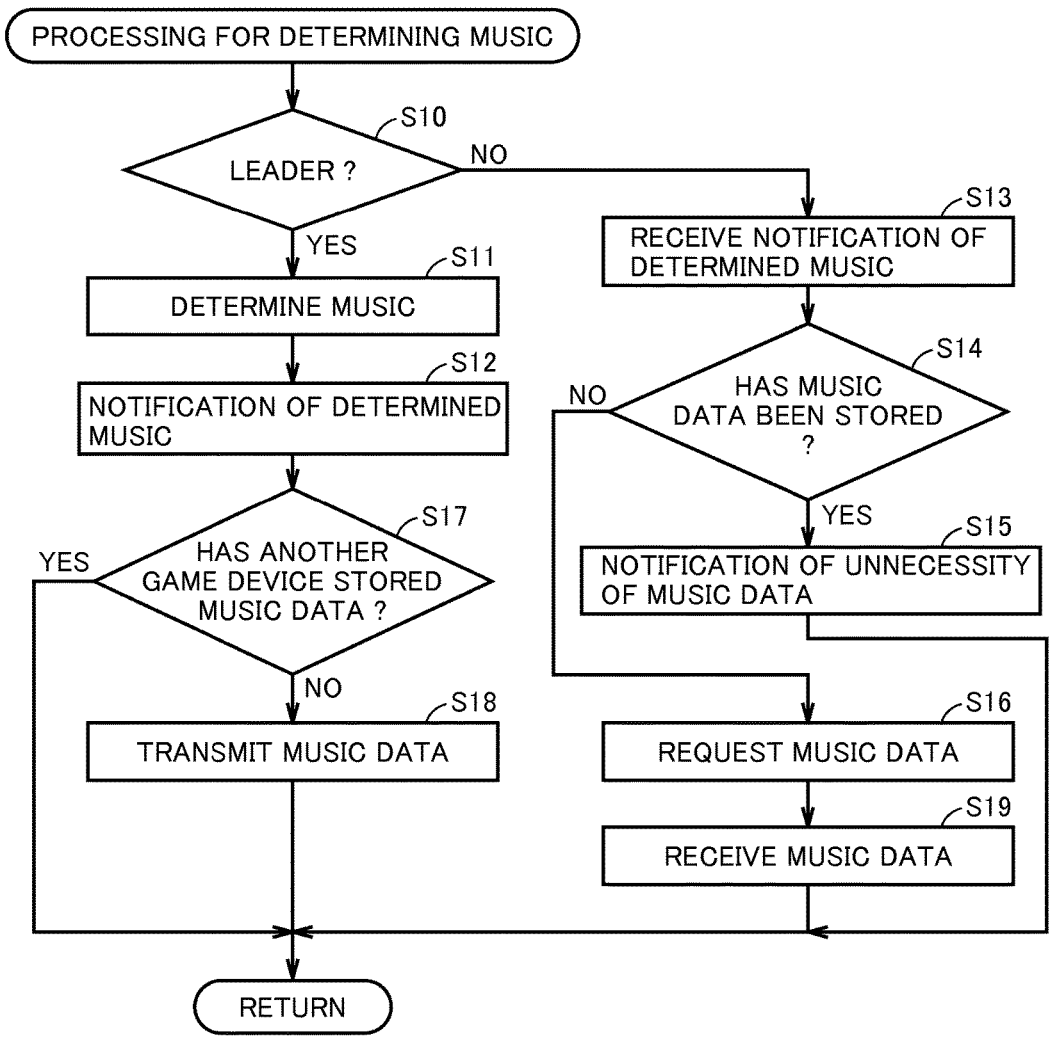
FIG. 8 shows an exemplary illustrative non-limiting flowchart showing details of processing for determining a music (step S3) shown in FIG. 7 according to the exemplary embodiment.

FIG. 8 is a flowchart showing details of the processing for determining a music (step S3) shown in FIG. 7 according to the present embodiment.

Referring to FIG. 8, in the processing for determining a music, initially in step S10, CPU 211 determines whether or not a player has been set as the leader. When CPU 211 determines in step S10 that a player has been set as the leader (YES in step S10), processing in step S11 is performed.

On the other hand, when CPU 211 determines in step S10 that a player has not been set as the leader (NO in step S10), processing in step S13 is performed.

In the game device of the leader, the processing in step S11 is performed. Namely, in step S11, CPU 211 determines a music to be played during a performance period. Determination of a music is made as the player of game device 10 designates as music data 56, a desired music among musics stored in main memory 23. Consequently, data for identifying a determined music is registered in main memory 23 as played music designation data 59. Namely, in the present embodiment, the player who uses the game device which is the leader can determine a music to be played. Though a case that the player who uses the game device which is the leader determines a music to be played is described in the present example, limitation to that scheme is not particularly intended, and selection of a music by another game device in the group may also be requested and a music may be determined based on majority rule. Alternatively, in another embodiment, a music may randomly be determined as music data 56, from among musics stored in main memory 23. Alternatively, server 1 may store music data and a music to be played may be determined from among the musics stored in server 1.

A music determined in step S11 is hereinafter also referred to as a music to be played or a played music.

In the following step S12, CPU 211 notifies another game device of a music to be played. Specifically, data indicating the music to be played (played music designation data 59) is transmitted from wireless communication module 37 through a network to another game device. In the game device set as the leader, after step S12, processing in step S17 which will be described later is performed.

On the other hand, in a game device which is not the leader, the processing in step S13 is performed. Namely, in step S13, CPU 211 receives notification of the determined music to be played (step S12) through wireless communication module 37. Specifically, played music designation data 59 is received from the game device serving as the leader and registered in main memory 23. Thus, the game device which is not the leader can know the music to be played.

In the following step S14, CPU 211 determines whether or not music data of the music to be played has been stored in main memory 23 of the game device of the player himself/herself. It is noted that, in the present embodiment, game device 10 is assumed to be able to newly store music data created by a player or to obtain new music data from another device. Therefore, music data stored in each game device does not necessarily match and music data stored in a certain game device may not be stored in another game device.

When CPU 211 determines in step S14 that music data of the music to be played is stored in main memory 23 of the game device of the player himself/herself (YES in step S14), processing in step S15 is performed.

On the other hand, when CPU 211 determines in step S14 that music data of the music to be played is not stored in main memory 23 of the game device of the player himself/herself (NO in step S14), processing in step S16 is performed.

In step S15, CPU 211 notifies the game device serving as the leader of the fact that transmission of music data is not necessary. On the other hand, in step S16, CPU 211 requests transmission of music data. Namely, a game device which is not the leader requests transmission of music data through wireless communication module 37 when it does not store the music data of the music to be played, and it gives notification that transmission is not necessary through wireless communication module 37 when it stores the music data.

After step S15, CPU 211 ends the processing for determining a music shown in FIG. 8. In addition, after step S16, CPU 211 performs processing in step S19 which will be described later. On the other hand, in the game device serving as the leader, the processing in step S17 is performed after step S12. Namely, in step S17, CPU 211 determines whether or not all other game devices have stored music data of the music to be played. Determination in step S17 can be made based on contents transmitted from another game device in step S15 or S16. Namely, when at least one other game device requests transmission of music data, determination as not storing is made in step S17 (NO in step S17).

On the other hand, when all other game devices have given notification that transmission of music data is not necessary, determination as storing is made in step S17 (YES in step S17). When determination as NO is made in step S17, processing in step S18 is performed. On the other hand, when a result of determination in step S17 indicates positive, the processing in step S18 is skipped and CPU 211 ends the processing for determining a music shown in FIG. 8 (return).

In step S18, CPU 211 transmits through wireless communication module 37, music data of the music to be played to another game device which requested transmission of the music data, that is, another game device not storing the music data of the music to be played.

On the other hand, in a game device which is not the leader, the processing in step S19 is performed following step S16. In step S19, CPU 211 receives music data transmitted in step S18 from the game device serving as the leader through wireless communication module 37. Thus, a player of a game device which is not the leader can play a music which is not known by the game device of the player himself/herself (a music of which music data is not stored in the game device) in ensemble and the number of musics which can be played in the game device of the player himself/herself can be increased. After step S19, CPU 211 ends the processing for determining a music shown in FIG. 8 (return). Though a case that, regarding music data determined by the game device serving as the leader, when another game device which is not the leader in the group does not store the music data, it requests music data to the game device serving as the leader and receives the music data, has been described in the present example, limitation thereto is not particularly intended, and for example, when the music data is not stored, selection again of music data to be played may be requested to the game device serving as the leader or play in ensemble may be canceled.

<4.3 Flow of Processing for Determining Part>

Details of the processing for determining a part will now be described.

Figure 9:
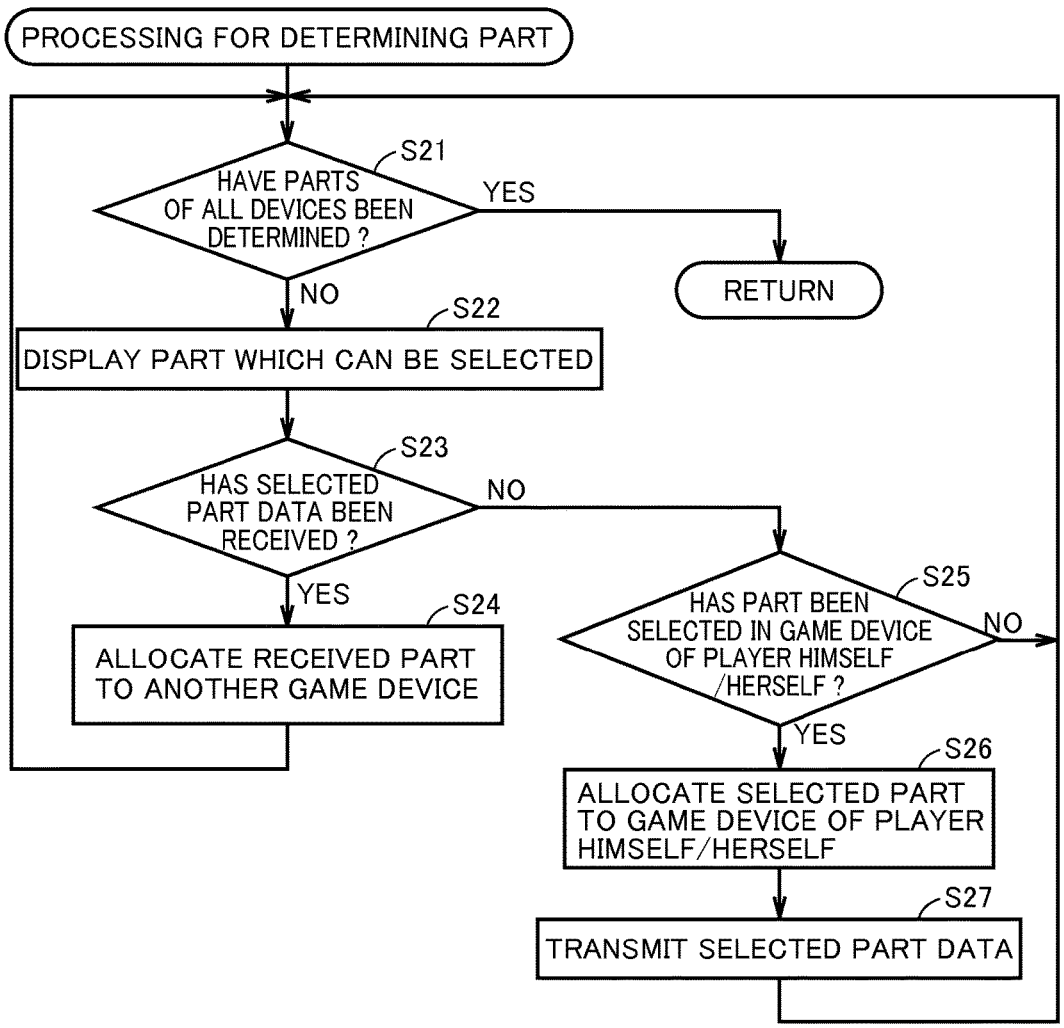
FIG. 9 shows an exemplary illustrative non-limiting flowchart showing details of processing for determining a part (step S4) shown in FIG. 7 according to the exemplary embodiment.

FIG. 9 is a flowchart showing details of the processing for determining a part (step S4) shown in FIG. 7 according to the present embodiment.

Referring to FIG. 9, in the processing for determining a part, initially in step S21, CPU 211 determines whether or not all game devices in the group have determined parts.

Determination in step S21 is made by referring to part data 57 stored in main memory 23. Namely, when there is data showing correspondence between a game device and a part for all game devices by referring to part data 57, it is determined that all game devices have determined the parts.

When it is determined in step S21 that all game devices in the group have determined the parts (YES in step S21), CPU 211 ends the processing for determining a part shown in FIG. 9 (return).

It is noted that, when it is determined that all game devices in the group have determined the parts and when the number of parts is greater than the number of game devices, remaining part(s) not determined may be processed as part(s) for automatic performance or absence of performance (no performance).

On the other hand, when it is determined in step S21 that all game devices in the group have not determined the parts (NO in step S21), processing in step S22 is performed.

In step S22, CPU 211 causes upper LCD 11 or lower LCD 12 to display a part which can be selected by a player, among parts of a music to be played. It is noted that, in the present embodiment, the same part can be prevented from being allocated to a plurality of game devices by way of example. Namely, in step S22, display is provided such that parts already selected by other game devices are excluded and selection only from remaining parts can be made. Specifically, when correspondence between a game device and a part is contained in part data 57 stored in main memory 23, that part is excluded. As a manner of display, only remaining parts may be displayed, or remaining parts and already selected parts may be displayed as being distinguished from each other based on difference in color thereof or the like. Alternatively, selection of a part the same as the already selected part may be allowed.

In the following step S23, CPU 211 determines whether or not data indicating a selected part (selected part data) has been received from another game device through wireless communication module 37. Here, when a part has been selected in another game device, selected part data is transmitted from another game device. In step S23, CPU 211 determines whether or not the selected part data has been transmitted.

When it is determined in step S23 that the selected part data has been received (YES in step S23), processing in step S24 is performed. When it is determined in step S23 that the selected part data has not been received (NO in step S23), processing in step S25 is performed.

In step S24, CPU 211 allocates a part selected in another game device to that another game device. Namely, the part indicated by the selected part data is allocated to the game device which has transmitted the selected part data in step S23.

Therefore, CPU 211 updates contents of part data 57 stored in main memory 23 so as to include information bringing a game device which has transmitted selected part data in step S23 and the part indicated by the selected part data in correspondence with each other. After step S24, the processing in step S21 is performed again.

On the other hand, in step S25, CPU 211 determines whether or not a part has been selected in the game device of the player himself/herself. Specifically, whether or not an operation for selecting one of parts displayed in step S22 has been performed is determined based on input provided to operation switch 14 and touch panel 15.

When CPU 211 determines in step S25 that a part has been selected in the game device of the player himself/herself (YES in step S25), processing in step S26 is performed. When CPU 211 determines in step S25 that a part has not been selected in the game device of the player himself/herself (NO in step S25), the processing in step S21 is performed again.

In step S26, CPU 211 allocates the part selected in step S25 to the game device of the player himself/herself. Then, CPU 211 updates contents of part data 57 stored in main memory 23 so as to include information bringing the game device of the player himself/herself and the part selected in step S25 in correspondence with each other.

In the following step S27, CPU 211 transmits the selected part data indicating the part selected in step S25 to all other game devices included in the group, by referring to group data 58. After step S27, the processing in step S21 is performed again.

As described in connection with steps S21 to 27 above, in the present embodiment, a part allocated to each game device is determined as a player of each game device included in the group selects a part on the first-come and first-served basis. It is noted that, in another embodiment, a part allocated to each game device may randomly be determined or an order of players selecting parts may randomly be determined. In addition, though a case that the same part is not allocated to a plurality of game devices has been described in the present example by way of example, limitation to that case is not particularly intended, and allocation of the same part to a plurality of game devices may be allowed. Specifically, in step S22, all selectable parts of a music to be played may be displayed. Alternatively, the number of game devices to which the same part is allowed to be allocated may be restricted.

<4.4 Flow of Performance Processing>

Details of the performance processing will now be described.

Figure 10:
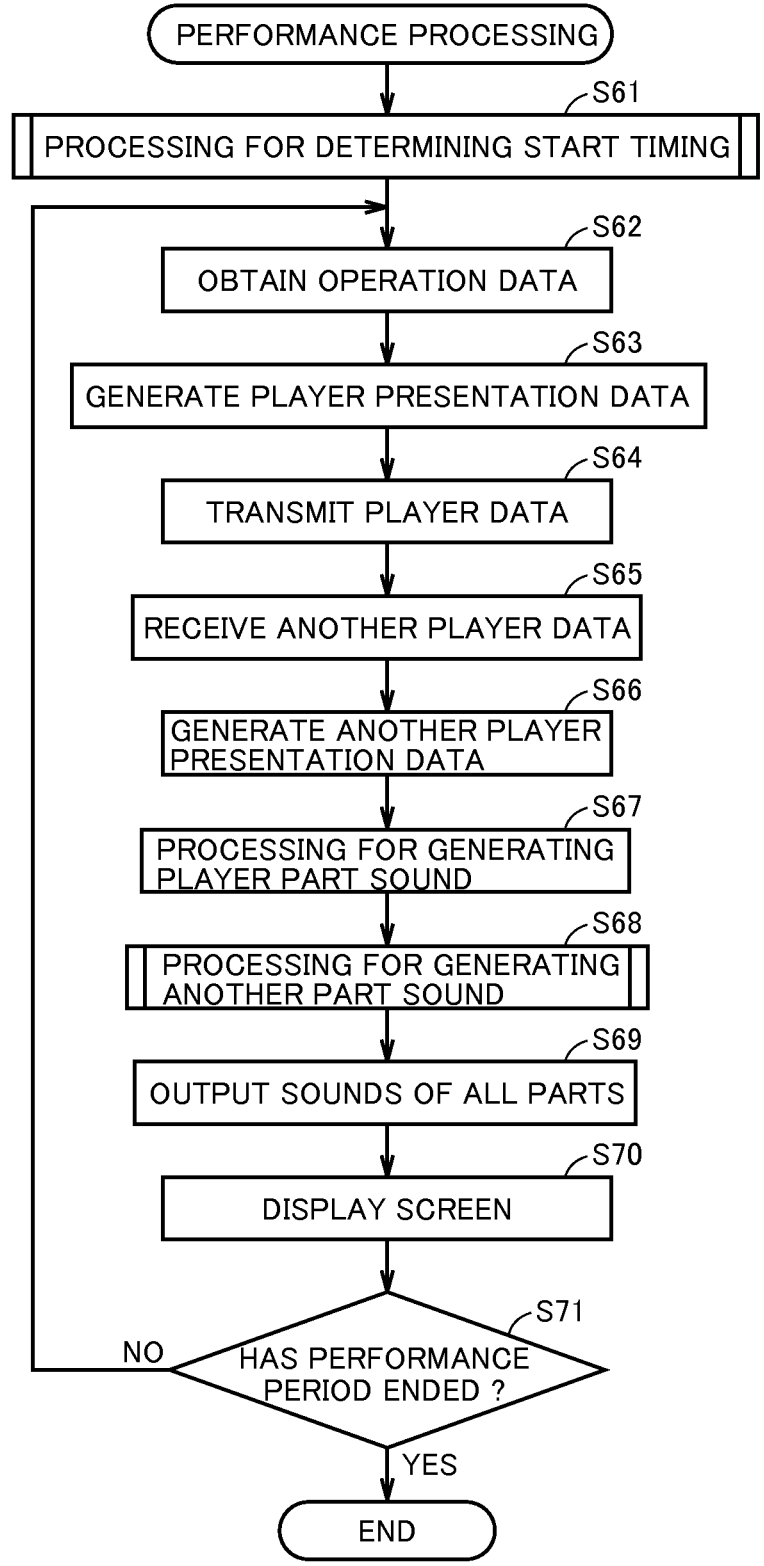
FIG. 10 shows an exemplary illustrative non-limiting flowchart showing details of performance processing (step S5) shown in FIG. 7 according to the exemplary embodiment.

FIG. 10 is a flowchart showing details of the performance processing (step S5) shown in FIG. 7 according to the present embodiment.

Referring to FIG. 10, in the performance processing, initially in step S61, CPU 211 performs processing for determining start timing.

The processing for determining start timing is processing for determining timing to start a performance period. It is noted that a performance period refers to a period during which a player can give a performance, and in other words, it refers to a period during which a game device accepts a performance operation by a player. The processing for determining start timing will be described later.

Then, following the processing for determining start timing in step S61, a processing loop in steps S62 to S71 is executed. It is noted that this processing loop is executed such that one processing loop is executed every one frame time.

In step S62, CPU 211 obtains from operation switch 14, operation data indicating a performance operation performed onto a performance button of the game device of the player himself/herself. The operation data includes data indicating whether or not each performance button has been pressed.

In the following step S63, CPU 211 generates presentation data used for generation of sound of a player part through prescribed conversion set in the game device of the player himself/herself, of operation data obtained in step S62. Specifically, a type of a performance button of which pressing is indicated by the operation data is changed based on a part in music data 56. When the operation data indicates that a correct performance button has been pressed, as presentation data, the operation data is changed to contents showing that a correct performance button to be pressed at the current timing has been pressed.

Here, a correct performance button to be pressed can be specified by referring to music data 56. In addition, when the operation data indicates that a certain button (such as a cross-shaped key) is pressed at the timing to simultaneously press the L button or the R button and the certain button, as presentation data, the operation data is changed to contents showing that the certain button and the L button or the R button are simultaneously pressed. It is noted that whether or not it is timing to press the L button or the R button can be determined by referring to music data 56.

Namely, in step S63, CPU 211 compares the operation data obtained in step S62 and performance operation instruction data of a part corresponding to a player included in music data with each other, determines that at least timing of both is within an allowable range, determines that the timing of at least both is within the allowable range, and converts the operation data obtained in step S62 to presentation data determined by music data based on a result of comparison. By way of example of presentation data, in the case of match, a performance flag is set to on by way of example of presentation data (turning on of performance flag data), and in the case of unmatch, a performance flag is not set to on by way of example of presentation data (turning off of performance flag data).

Furthermore, in comparison, in the case of unmatch, deviation relation of an operation type (for example, a type of a pressed performance button) between the operation data obtained in step S62 and the performance operation instruction data included in music data may further be determined. Specifically, regarding sound brought in correspondence with a performance button, based on a type of an operation of a pressed performance button, the number of intervals deviated from correct sound corresponding to the performance operation instruction data may be included in presentation data.

It is noted that, regarding music data, in a musical score, there is also a prescribed portion such as a rest position and a performance-absent portion where no note is present. For that prescribed portion, it is also possible that performance operation instruction data and performance output data corresponding thereto are not provided, data on an operation on that prescribed portion is processed as invalid, and a silent state (generation of no presentation data) can be set. Alternatively, it is also possible that data on an operation on that prescribed portion is also accepted to generate presentation data. In this case, any operation data should only be allowed as performance operation instruction data, and performance flag data should only be set to on as presentation data. Then, with turning on of the performance flag data, sound to be output may be set in advance for performance output data, or sound in accordance with a performance button can also arbitrarily be output, with information on sound brought in correspondence with a performance button being included in the presentation data. With such processing, what is called ad-lib performance can be realized.

In the following step S64, CPU 211 generates player data by using obtained operation data, and transmits the player data to another game device registered in group data 58 through wireless communication module 37.

Figure 11:
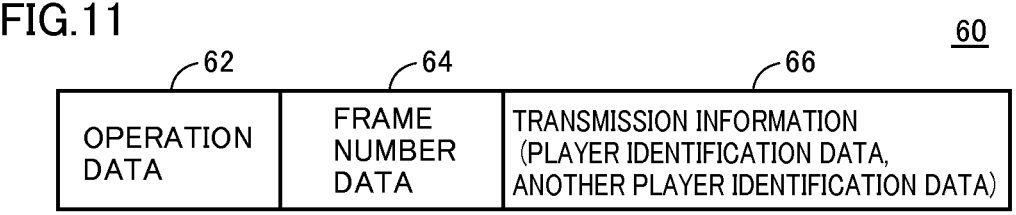
FIG. 11 shows an exemplary illustrative non-limiting diagram illustrating outlines of a packet configuration of player data 60 to be transmitted according to the exemplary embodiment.

FIG. 11 is a diagram illustrating outlines of a packet configuration of transmitted player data 60 according to the present embodiment.

Referring to FIG. 11, player data 60 includes operation data 62 in step S62, frame number data 64 indicating a frame time at which the operation data was obtained, and transmission information 66. It is noted that header information including an identification number or the like for identifying other packets may be added. The frame number data shows a number incremented one by one for each one frame, for example, with a frame number obtained at the time point of start of a performance period being defined as "1". The transmission information includes data identifying a game device of a player himself/herself which is a sender (player identification data) and data identifying a game device of another player registered in group data 58 which is a destination (another player identification data).

Though information on a type of a pressed performance button is described as operation data in the present example by way of example, instead of a type of a performance button, true/false data of an operation (evaluation information indicating whether or not a correct operation has been performed, which is obtained by comparing operation data and performance operation instruction data with each other in each game device) may be transmitted to a game device of another player. Then, in the game device of another player, conversion to presentation data may be carried out based on received evaluation information (true/false data of operation). In addition, the evaluation information may include an amount of deviation from a correct operation and then conversion to presentation data based on the amount of deviation may be made. Estimated presentation data based on an amount of deviation from a correct operation may be generated in accordance with the evaluation information.

It is noted that this is also the case with a packet configuration of received another player data.

Referring again to FIG. 10, as the processing in step S64 is performed for each one frame, data is successively transmitted for each one frame from each game device to another game device. It is noted that another game device successively receives transmitted data for each one frame. It is noted that a game device which is the destination may send back acknowledgement of reception of performance data to a sender game device such that performance data transmitted from the game device to another game device is reliably received by the destination game device. Here, the sender game device may transmit again performance data when it has transmitted performance data but does not receive a reply within a prescribed time period. In addition, player data 60 generated as above is stored in main memory 23.

Though game device 10 successively transmits player data during a performance period in the present embodiment, in another embodiment, a game device may transmit player data in a batch to another game device every prescribed period not affecting performance processing.

In the following step S65, CPU 211 receives data transmitted from another game device registered in group data 58 (another player data) through wireless communication module 37. Then, that data is stored in main memory 23 for each game device as another player performance data 53.

It is noted that a status of communication among game devices is not always constant but delay may also occur, and therefore, in the processing loop in steps S62 to S71 in a certain frame, another player data may not be received, data may be received a plurality of times in another processing loop, and another player presentation data may be generated a plurality of times in correspondence with such reception. In addition, when a status of communication varies, packet loss may also occur.

In the following step S66, CPU 211 generates presentation data used for generation of sound of another part through prescribed conversion set in a game device of another player, of another player data received in step S65. Specifically, a type of a performance button of which pressing is indicated by the operation data is changed based on a part in music data 56. As described above in connection with step S63, when the operation data indicates that a correct performance button has been pressed, as presentation data, the operation data is changed to contents showing that a correct performance button to be pressed at the current timing has been pressed.

Namely, in step S66, CPU 211 compares the operation data included in another player data received in step S65 and performance operation instruction data of a part corresponding to another player included in music data with each other, determines that at least timing of both is within an allowable range, and converts the operation data received in step S65 to presentation data determined by music data based on a result of comparison. By way of example of presentation data, in the case of match, a performance flag is set to on (turning on of performance flag data), and in the case of unmatch, a performance flag is not set to on (turning off of performance flag data).

After step S66, in steps S67 to S69, performance sounds of a player part and another part are generated and output.

Namely, in step S67, CPU 211 generates performance sounds of the player part by using presentation data processed in step S63. Namely, a performance button pressed by a player in the current frame is determined based on the operation data and an interval of sound to be output is determined based on a type of the pressed performance button. More specifically, the player part is determined by referring to part data 57, and sound data corresponding to the player part is used.

Namely, for example, when a player part is a guitar, guitar sound data is used, and when a player part is a piano, piano sound data is used. It is noted that, when sound of each part is changed for each music (or for each portion of a music) or when sound to be output is changed in response to a performance button operation for each music (or for each portion of a music), sound data corresponding to the player part included in music data of a music designated by played music designation data 59 is used.

By way of example, in a case that corresponding sound is output only when a player operation is a correct operation, that is, in a case that corresponding sound is output only when a player performs an operation at correct timing based on a performance operation instruction (and with a correct performance button operation), whether or not the operation data indicates correct timing (and a correct performance button operation) is determined based on performance operation instruction data for a player part included in music data of a music designated by played music designation data 59, and corresponding sound is output only when determination indicates positive. Specifically, as presentation data, corresponding sound is output only when a performance flag is on.

In the following step S68, CPU 211 generates performance sound of another part by using music data 56. Specifically, music data 56 is referred to, sound to be output at timing in the current frame is specified, and the specified sound is set as performance sound of another part. Thus, sound of the player part generated in step S67 and sound of another part generated in step S68 can be synchronized with each other.

It is noted that, since delay may occur in communication between/among game devices as described above, a game device does not necessarily receive all data transmitted from another game device at appropriate timing when a degree of delay is great. In addition, it is also possible that packet loss has occurred. Then, in the present embodiment, based on data received from another game device, estimation data obtained by estimation for outputting sound of another part in accordance with performance by a player playing another part is generated as necessary and performance sound of another part is output based on the generated estimation data.

Details of processing for generating performance sound of another part will be described later.

In the following step S69, CPU 211 causes speaker 18 to output performance sound of the player part generated in step S67 and performance sound of another part generated in step S68. Namely, while performance sound of the player part is output in accordance with a performance operation by a player, performance sound of another part generated with the use of music data 56 is output.

It is noted that, in a case that automatic performance rather than performance by a player is set for another part (for example, in a case that the number of game devices included in the group is smaller than the number of parts constituting a music to be played), automatic performance sound of another part is output with the use of music data 56. For example, regarding automatic performance of another part, as presentation data, all performance flags may be set to on so as to output performance sound of another part, or audio file data may be prepared for each part and performance sound may be output based on audio file data of a corresponding part.

Through steps S67 to S69 above, performance sound of each part of a music to be played is output in ensemble.

It is noted that, in step S69, based on audio file data of BGM included in music data, performance sound serving as BGM of a music may be output and performance sound of a player part, performance sound of another part, and performance sound of BGM may be output as combined.

In the following step S70, CPU 211 causes upper LCD 11 or lower LCD 12 to display a game image (FIG. 4) representing a performance operation instruction of a player part registered in part data 57 by referring to music data designated by played music designation data 59. The game image can be generated based on music data 56.

In step S71, CPU 211 determines whether or not a performance period has ended. Since a length of a performance period is determined by a length of a played music, determination in step S71 can be made by using a length of a played music with reference to music data 56. When CPU 211 determines in step S71 that the performance period has ended (YES in step S71), the processing ends (end).

On the other hand, when CPU 211 determines in step S71 that the performance period has not ended (NO in step S71), the processing in step S62 is performed again, and subsequently, the processing loop in steps S62 to S71 is repeatedly executed until the performance period ends.

<4.4.1 Flow of Processing for Determining Start Timing>

Figure 12:
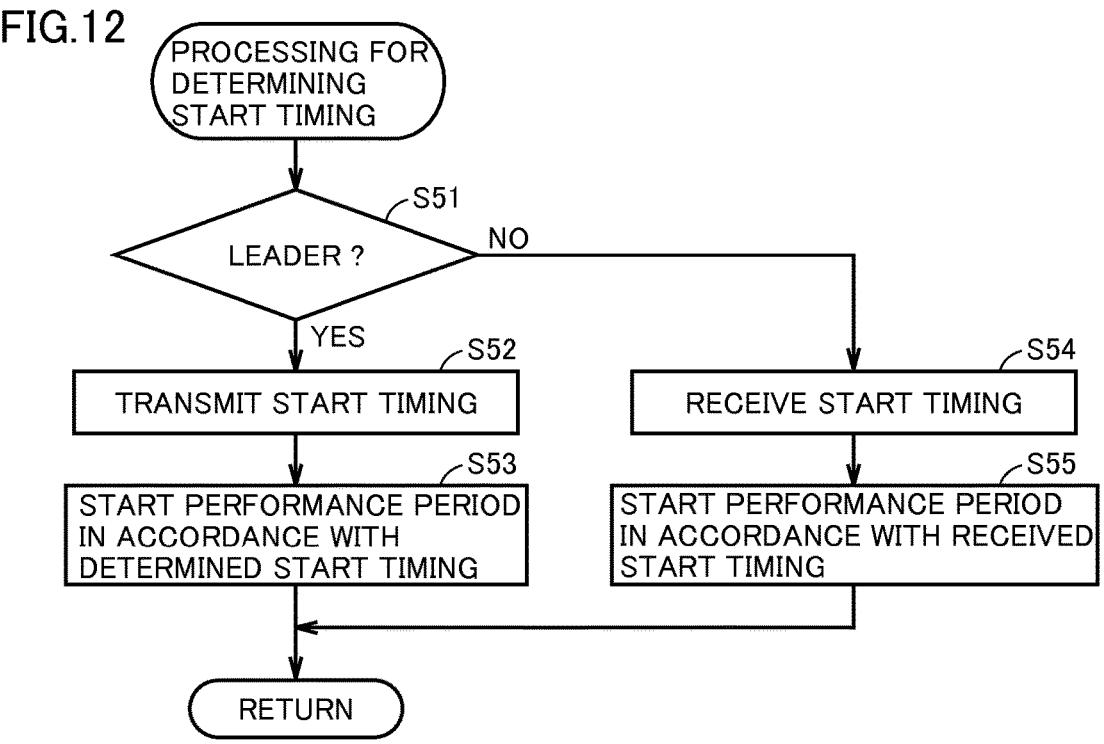
FIG. 12 shows an exemplary illustrative non-limiting flowchart showing details of processing for determining start timing (step S61) shown in FIG. 10 according to the exemplary embodiment.

FIG. 12 is a flowchart showing details of the processing for determining start timing (step S61) shown in FIG. 10 according to the present embodiment.

Referring to FIG. 12, in the processing for determining start timing, initially in step S51, CPU 211 determines whether or not a player has been set as the leader.

When CPU 211 determines in step S51 that a player has been set as the leader (YES in step S51), processing in step S52 is performed. When CPU 211 determines in step S51 that a player has not been set as the leader (NO in step S51), processing in step S54 is performed.

In the game device serving as the leader, the processing in steps S52 and S53 is performed. Namely, in step S52, CPU 211 determines timing to start a performance period and transmits data indicating the timing to another game device. The data may be, for example, data indicating remaining time until the performance period is started, data indicating time to start the performance period, or data instructing immediate start of performance. In addition, timing to give notification to another game device may be determined in consideration of a delay time in a case that data is transmitted from the game device serving as the leader to another game device. Here, the game device serving as the leader may transmit data of different contents to other game devices, such that the timing is substantially the same among game devices in the group, in consideration of a calculated delay time.

In the following step S53, CPU 211 starts performance in accordance with the timing determined in step S52. Namely, the processing loop in steps S62 to S71 (FIG. 10) which described above is started. After step S53, CPU 211 ends the processing for determining start timing shown in FIG. 12 (return).

On the other hand, in a game device which is not the leader, processing in steps S54 and S55 is performed. Namely, in step S54, CPU 211 receives data indicating timing to start a performance period from the game device serving as the leader. In the following step S55, CPU 211 starts performance in accordance with start timing indicated by the data received in step S54. After step S54, CPU 211 ends the processing for determining start timing shown in FIG. 12 (return).

Through the processing for determining start timing described above, the timing to start a performance period is in synchronization among game devices in the group. Namely, each game device starts performance substantially at the same timing and ends performance substantially at the same timing. Thus, occurrence of delay of data from another game device due to deviation in timing to start can be suppressed. It is noted that the timing to start in each game device does not have to strictly be simultaneous, and, for example, deviation in start timing to some extent in each game device may be allowed so long as it does not affect performance processing. It is noted that, in the present example, even in a case that delay of data from another game device occurs due to deviation in start timing in each game device, performance sound of another game device is output owing to generation of estimated presentation data based on interpolation processing which will be described later, and therefore, uncomfortableness due to influence by data delay caused by deviation in start timing can be suppressed. Though a case that start timing is transmitted from a game device set as the leader to another game device in the processing for determining start timing has been described by way of example, for example, start timing may be broadcast to each game device from server 1.

<4.4.2 Flow of Processing for Generating Another Part Sound>

Figure 13:
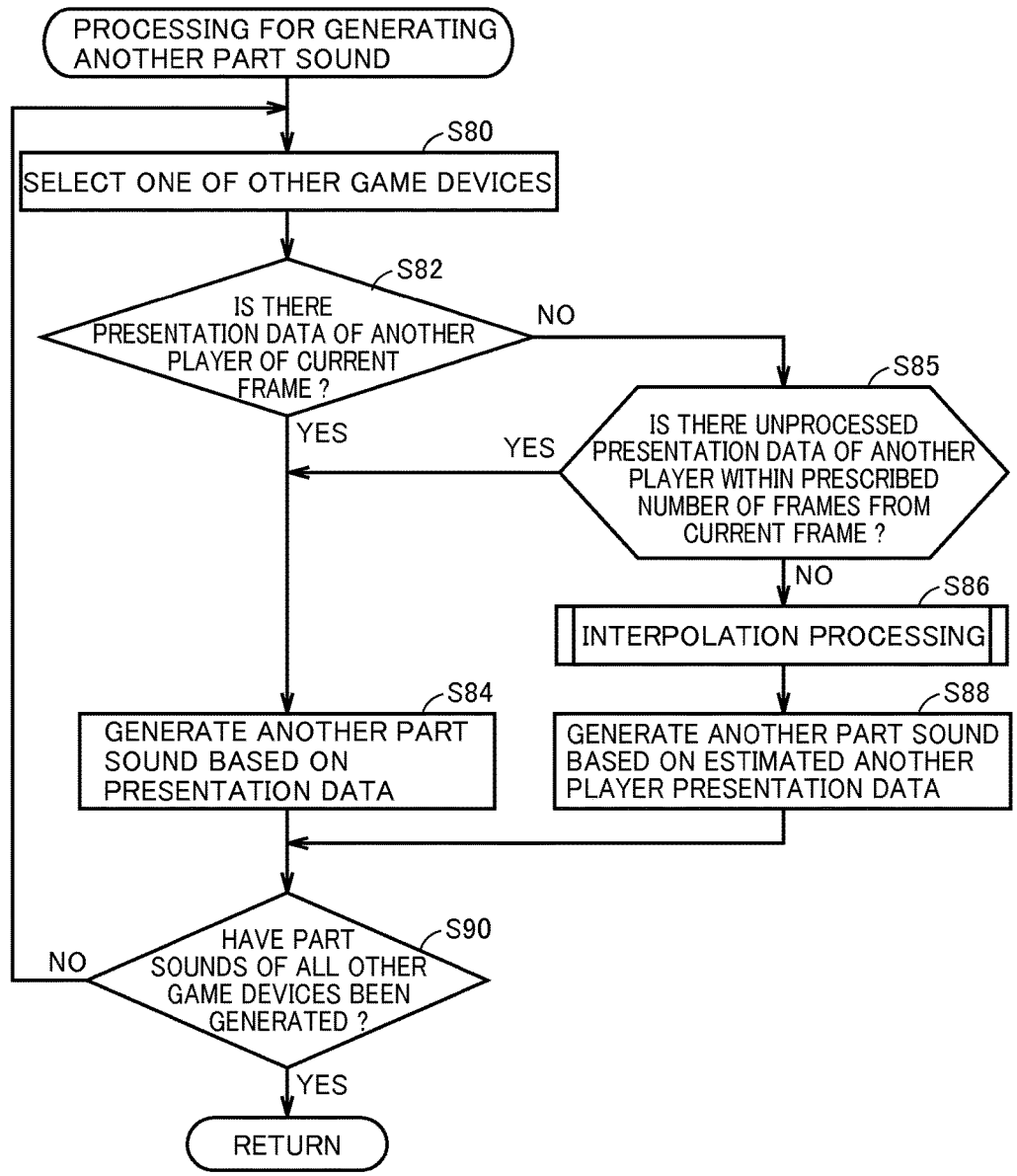
FIG. 13 shows an exemplary illustrative non-limiting flowchart showing details of processing for generating another part sound (step S68) shown in FIG. 10 according to the exemplary embodiment.

FIG. 13 is a flowchart showing details of the processing for generating another part sound (step S68) shown in FIG. 10 according to the present embodiment. Regarding this processing for generating another part sound, the processing is performed for each game device registered in group data 58.

Referring to FIG. 13, in the processing for generating another part sound, initially in step S80, CPU 211 selects one of other game devices in the group. It is noted that a game device other than a game device already selected during the processing for generating another part sound once is selected. In processing in steps S82 to S88, sound of a part corresponding to a game device selected in step S80 is generated.

In step S82, CPU 211 determines whether or not presentation data of another player corresponding to the current frame (presentation data of a game device of another player generated in step S66 in FIG. 10) has been stored in main memory 23.

When communication with another game device is normally established in step S82, CPU 211 determines in step S82 that there is presentation data of another player corresponding to the current frame (YES in step S82) and performs processing in step S84.

In step S84, CPU 211 generates performance sound of another part corresponding to another game device selected in step S80, by using presentation data of another player. Presentation data of another player is stored in main memory 23 in step S66 for the performance processing described above.

A method of generating performance sound of another part by using presentation data of another player is the same as the method of generating performance sound of a player part by using presentation data of a player. It is noted that, in generating performance sound of another part by using another player data received from a certain game device, a part of the certain game device is determined by referring to part data 57 and sound data corresponding to that part is used for sound output based on another player data.

Namely, for example, in a case that a part of the certain game device is a guitar, guitar sound data is used, and when a part of the certain game device is a piano, piano sound data is used. It is noted that, when sound of each part is changed for each music (or for each portion of a music) or when sound to be output is changed in response to a performance button operation for each music (or for each portion of a music), sound data corresponding to a part of the certain game device included in music data of a music designated by played music designation data 59 is used. In addition, in a case that corresponding sound is output only when a player operation is a correct operation, whether or not operation data included in another player data of the certain game device indicates correct timing (and a correct performance button operation) is determined based on performance operation instruction data on a part of the certain game device and corresponding sound is output only when determination indicates positive.

On the other hand, since delay may occur in communication between/among game devices as described above during performance, a game device does not necessarily receive all data transmitted from another game device at appropriate timing when a degree of delay is great. In addition, it is also possible that packet loss has occurred. Consequently, another game device does not store data of a performance portion corresponding to the current frame in main memory 23.

When there is no presentation data of another player corresponding to the current frame (NO in step S82), the process proceeds to step S85 and CPU 211 determines in step S85 whether or not unprocessed presentation data of another player has been stored in main memory 23 within a prescribed number of frames from the current frame.

When there is unprocessed presentation data of another player within a prescribed number of frames from the current frame in step S85 (YES in step S85), the unprocessed presentation data of another player is used to generate performance sound as it is of another part corresponding to another game device described in connection with step S84 above. The presentation data of another player is stored in main memory 23 in step S66 for the performance processing described above. Namely, delay may occur in communication between/among game devices, however, when a degree of delay is not much problematic, the processing is for such performance processing as allowing such delay. The number of frames within this prescribed number of frames can be set to any value, however, it can be set to such an extent that performance sound of another part based on delayed presentation data of another player is not offensive to the ear.

Though a case that unprocessed presentation data of another player is used as it is without performing interpolation processing to thereby generate presentation data when there is such data within a prescribed number of frames is described in the present example, the data can also be used as it is without performing interpolation processing to thereby generate presentation data even when the prescribed number of frames is exceeded. Specifically, a case that data which can be used for interpolation processing, such as beat data that a note appears for the first time in a musical score or beat data that a note appears after an introduction period or a long rest period in a musical score, is not present, or the like is exemplified.

On the other hand, when unprocessed presentation data of another player is not stored in main memory 23 within a prescribed number of frames in step S85 (NO in step S85), interpolation processing in step S86 is performed. The interpolation processing estimates and interpolates presentation data of another player corresponding to the current frame when there is not such data. Details of the interpolation processing will be described later.

Then, in step S88, CPU 211 generates performance sound of another part corresponding to another game device selected in step S80 by using estimated presentation data of another player which has been subjected to the interpolation processing (also referred to as estimated presentation data). The estimated presentation data of another player is stored in main memory 23 in step S86 for the interpolation processing described above. A method of generating performance sound of another part with the use of estimated presentation data of another player is as described in connection with step S84.

Then, following step S84 or S88, processing in step S90 is performed. Namely, in step S90, CPU 211 determines whether or not sound of other parts corresponding to all other game devices in the group have been generated. When a result of determination in step S90 indicates positive, CPU 211 ends the processing for generating another part sound shown in FIG. 13 (return).

On the other hand, when CPU 211 determines in step S90 that sounds of other parts corresponding to all other game devices in the group have not been generated (NO in step S90), the processing returns to step S80 and the processing above is repeated.

Figure 14:
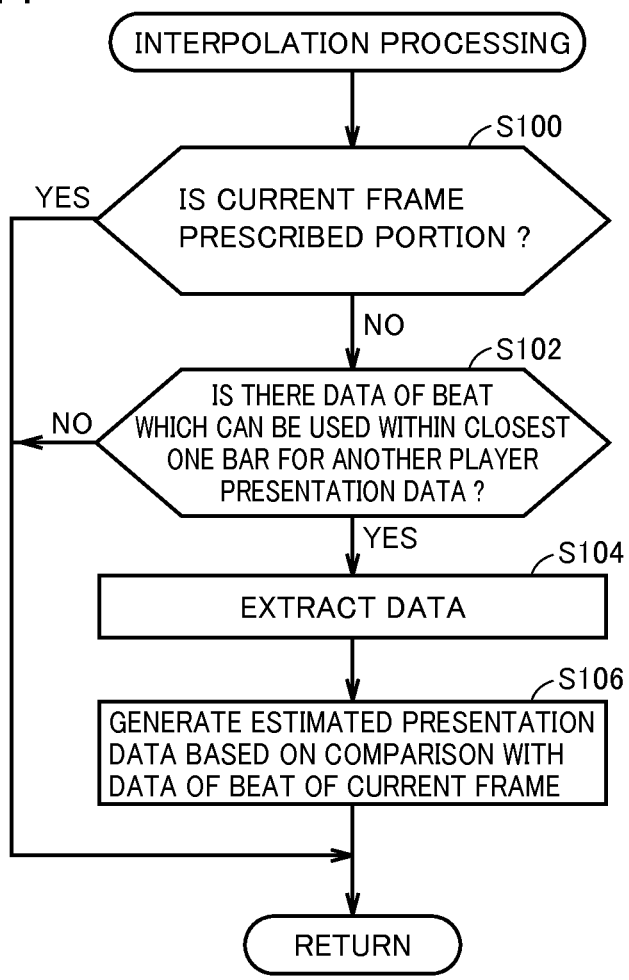
FIG. 14 shows an exemplary illustrative non-limiting flowchart showing details of interpolation processing (step S86) shown in FIG. 13 according to the exemplary embodiment.

FIG. 14 is a flowchart showing details of the interpolation processing (step S86) shown in FIG. 13 according to the present embodiment.

Referring to FIG. 14, initially, CPU 211 determines whether or not the current frame of a part of another player is a prescribed portion (step S100). In the present example, one example of the prescribed portion corresponds to a prescribed area in a musical score, specifically, a rest position or a performance-absent portion where no note is present. That processing is made for excluding generation of estimated presentation data for that portion, since the prescribed portion is a portion where no note which should essentially be played is present.

Therefore, when CPU 211 determines in step S100 that the current frame of the part of another player is the prescribed portion (YES in step S100), it does not generate estimated presentation data but the processing ends (return).

On the other hand, when the current frame of the part of another player is not the prescribed portion in step S100 (NO in step S100), the processing proceeds to next step S102.

Then, CPU 211 determines whether or not there is beat data which can be used within a closest one bar with regard to presentation data of another player (step S102). It is noted that, in the present example, search is started from beat data closest to the current frame time within the closest one bar.

When CPU 211 determines in step S102 that there is beat data which can be used within the closest one bar with regard to the presentation data of another player, the data is extracted (step S104).

Figure 17:
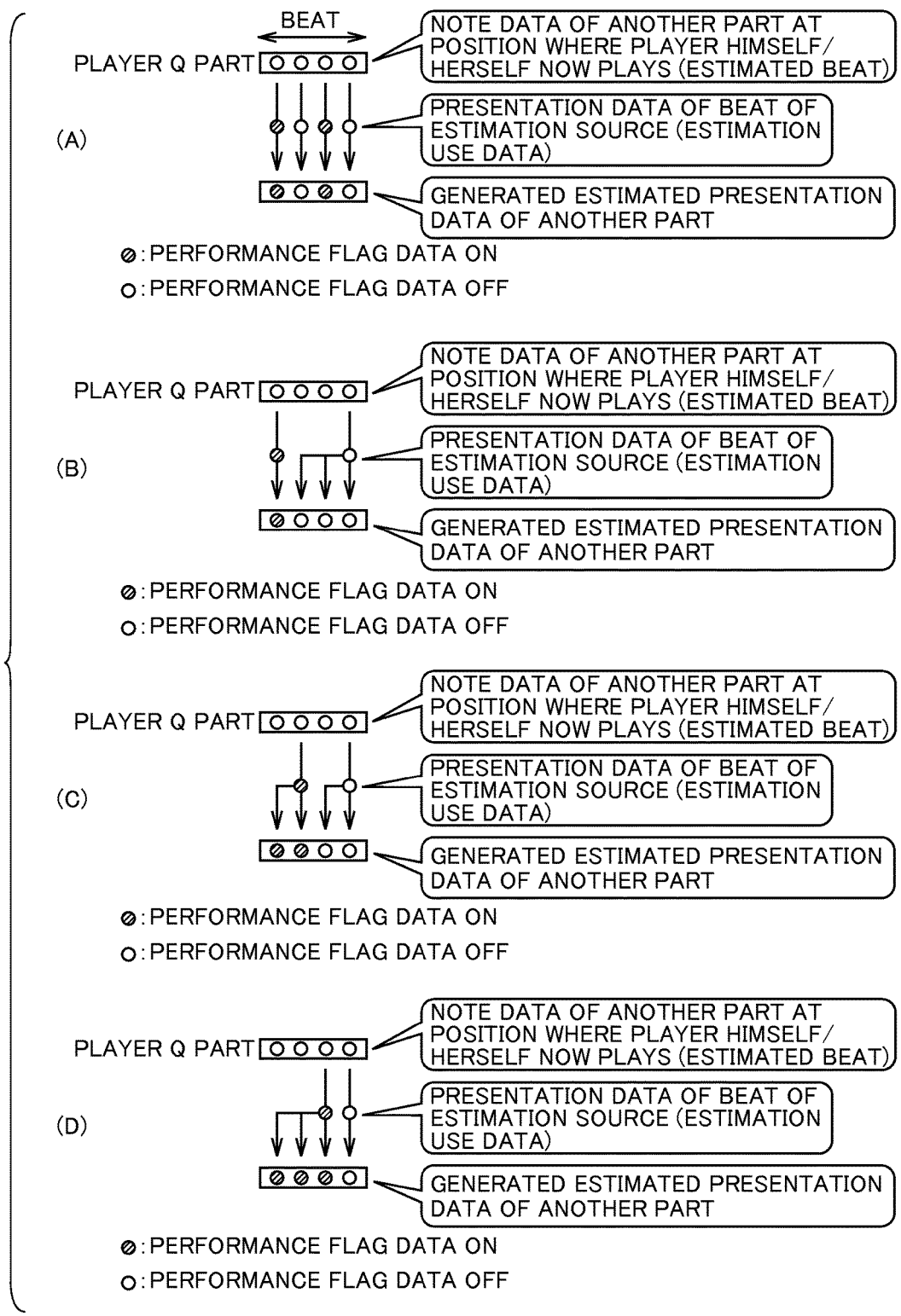
FIG. 17 shows an exemplary illustrative non-limiting diagram illustrating a specific example of generation of estimated presentation data according to the present embodiment.

Then, CPU 211 generates estimated presentation data based on comparison between the extracted data and the beat data of the current frame (step S106). Music data 56 is referred to for comparing the beat data of the current frame and the extracted data with each other. Then, the estimated presentation data is generated based on a result of comparison. Specifically, by way of example, a pattern of elements constituting beats (an element pattern) as the beat data and a pattern of elements of the extracted data are compared with each other and whether or not they are the same is determined. Based on a result of determination, the estimated presentation data is generated. Details of the processing will be described later (FIG. 17).

Then, the processing ends (return).

On the other hand, when CPU 211 determines in step S102 that there is no beat data which can be used within the closest one bar with regard to the presentation data of another player, estimated presentation data is not generated but the processing ends (return). In this case, since there is no estimated presentation data, performance sound of another part is processed as being absent (silent).

Though the closest one bar is described as a search range by way of example in the present example, such a closest range is set because, by estimating presentation data in accordance with a closest (immediately preceding) performance status, sound of another part is generated with a skill (technique) of an immediately preceding performance operation being immediately reflected, so that real-time feeling of a performance operation of another part can be realized. Though one bar is described by way of example in the present example, limitation to such a range is not particularly intended, and a plurality of bars or a length unit other than a bar can further also be set as a search range.

Though the description that whether or not the current frame of a part of another player is a prescribed portion is determined and estimated presentation data is not generated when it is the prescribed portion has been given in the above, it is also possible that estimated presentation data is not generated when the current frame of the part of the player is the prescribed portion.

5. Description of Details of Estimated Presentation Data

<5.1 Description of Performance Status of Ensemble Game>

Figure 15:
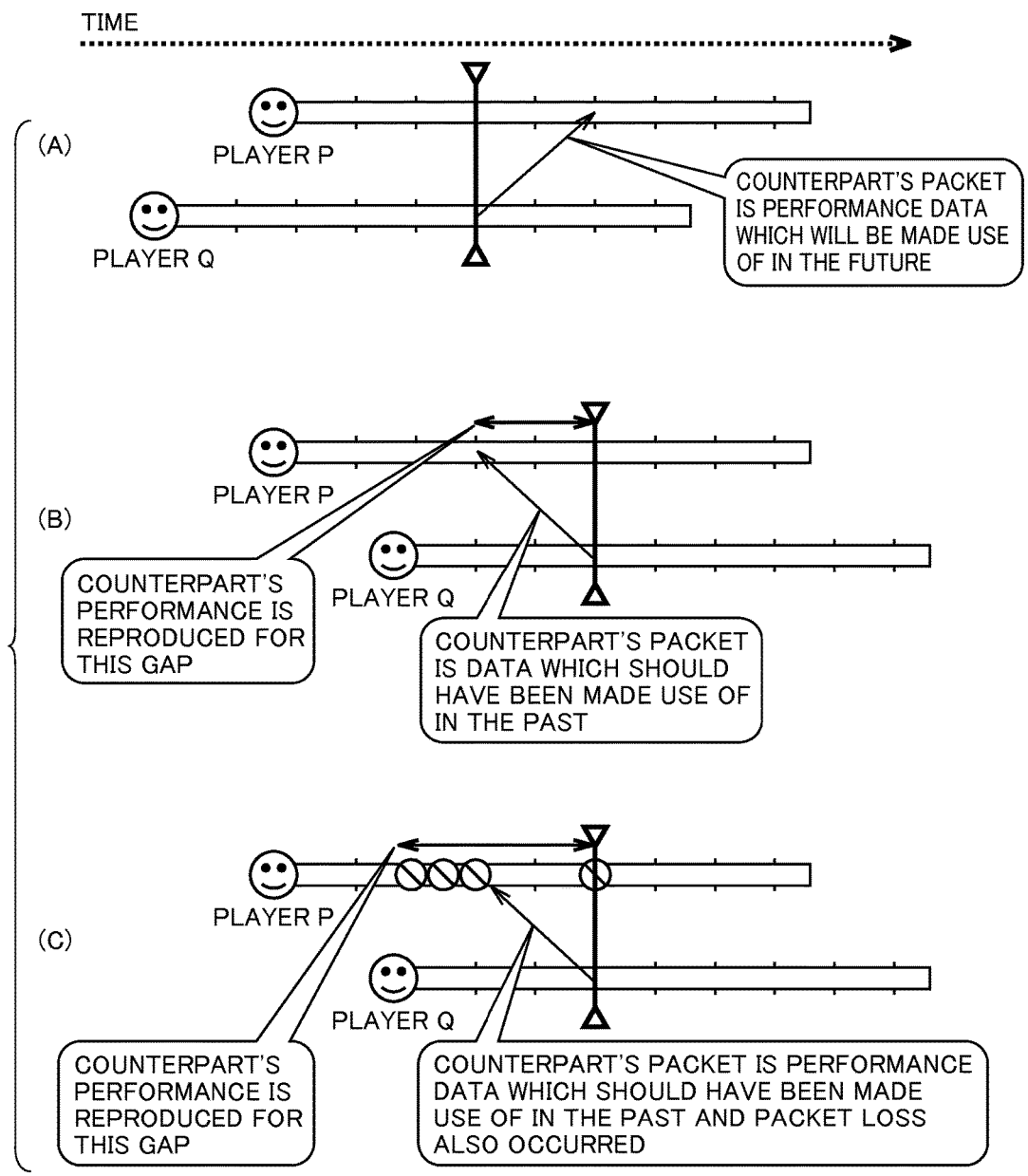
FIG. 15 shows an exemplary illustrative non-limiting diagram illustrating a status in a case that an ensemble game is played by a plurality of game devices according to the exemplary embodiment.

FIG. 15 is a diagram illustrating a status in a case that an ensemble game is played by a plurality of game devices according to the present embodiment.

Referring to FIG. 15, in the present example, performance statuses of two game devices are shown by way of example. Here, by way of example, with a game device operated by a player P being defined as the reference, a performance status of another game device operated by a player Q viewed from the game device operated by player P is shown. A case that the game device receives data from another game device operated by player Q is described.

In the present example, by way of example, the reason why performance statuses of the game devices are not exactly in synchronization with each other (deviation is caused) includes not only a case that progress statuses differ due to deviation in start timing of each game device but also a case that progress statuses differ due to deviation caused by delay in communication even though start timing was the same, a case that progress statuses differ due to combination thereof, or the like.

In FIG. 15 (A), regarding a performance status (a game progress status), a case that another game device operated by player Q progresses ahead of the game device operated by player P due to deviation in start timing and/or delay in communication is shown.

In that case, the game device operated by player P can receive from another game device operated by player Q, performance data made use of ahead of the frame (in the future) currently played by player P.

Performance data received by the game device operated by player Q is stored in main memory 23 as described above. Then, at the timing of player P giving a performance in the game device of the player himself/herself, presentation data of another player is generated based on operation data of the corresponding frame included in received performance data stored in main memory 23. Then, sound of another part is output in accordance with presentation data of another player.

Therefore, in the performance status, the game device operated by player P can in principle receive performance data from another game device operated by player Q without delay. Accordingly, at the timing when player P gives a performance in the game device of the player himself/herself, since there is corresponding presentation data of another player, estimated presentation data is not generated based on the interpolation processing.

In FIG. 15 (B), with regard to a performance status (a game progress status), a case that another game device operated by player Q progresses as delayed relative to the game device operated by player P due to deviation in start timing and/or delay in communication is shown.

In that case, the game device operated by player P receives performance data made use of before the frame (in the past) currently played by player P from another game device operated by player Q.

Performance data received by the game device operated by player P is stored in main memory 23 as described above. On the other hand, at the timing when player P gives a performance in the game device of the player himself/herself, main memory 23 does not store performance data of another player of the current corresponding frame.

Therefore, in the performance status, with regard to the game device operated by player P, performance data received from another game device operated by player Q is data corresponding to the frame of which play has already ended. Accordingly, in order to output sound of a part of another player of the corresponding frame currently played (in order to reproduce counterpart's performance for a gap), in the present example, estimated presentation data based on the interpolation processing is generated. Then, sound of a part of another player is output based on the estimated presentation data.

It is noted that, similarly, another game device operated by player Q in FIG. 15 (A) receives from the game device operated by player P, performance data made use of before the currently played frame (in the past). Therefore, since player Q similarly operates, another game device generates estimated presentation data based on the interpolation processing above and outputs sound of the part corresponding to the game device operated by player P based on the generated estimated presentation data.

In FIG. 15 (C), with regard to a performance status (a game progress status), a case that another game device operated by player Q progresses as delayed relative to the game device operated by player P due to deviation in start timing and/or delay in communication is shown. In addition, a case that a packet transmitted from another game device of player Q was lost in the game device operated by player P due to change in communication environment, that is, a case that a packet could not appropriately be obtained, is shown.

In that case, the game device of player P lost performance data to be made use of for the currently played frame from another game device of player Q and cannot receive the performance data.

Therefore, in the game device operated by player P, the lost performance data is not stored in main memory 23. Namely, at the timing when player P gives a performance in the game device of the player himself/herself, main memory 23 does not store performance data of another player of the current corresponding frame.

Therefore, in the performance status, with regard to the game device operated by player P, there is no performance data from another game device operated by player Q for the currently played corresponding frame. Accordingly, in order to output sound of a part of another player of the currently played corresponding frame (in order to reproduce counterpart's performance for a gap), in the present example, estimated presentation data based on the interpolation processing is generated. Then, sound of a part of another player is output based on the estimated presentation data.

Though a case that another game device operated by player Q progresses as delayed relative to the game device operated by player P and in addition a packet was lost is described here, estimated presentation data based on the similar interpolation processing is generated also when only packet loss has occurred, in a case that another game device operated by player Q and the game device operated by player P are the same in timing of progress. Then, sound of a part of another player is output based on the estimated presentation data.

<5.2 Description of Interpolation Processing>

Figure 16:
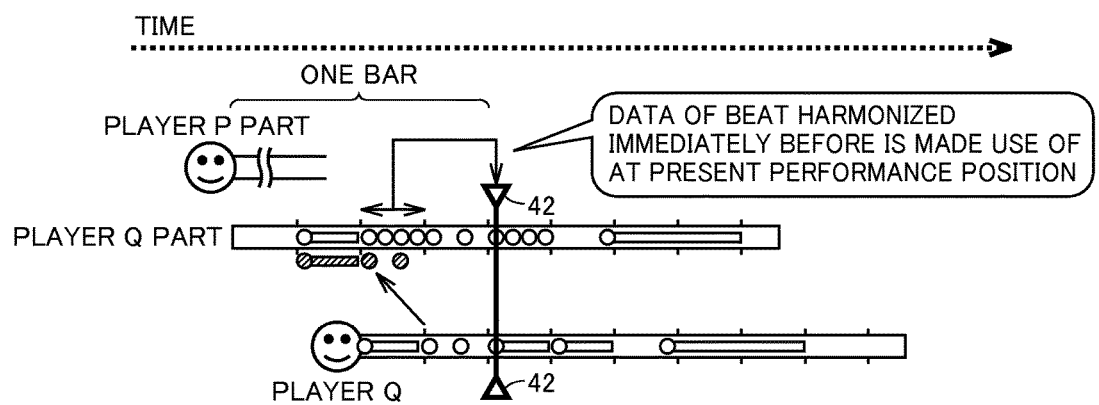
FIG. 16 shows an exemplary illustrative non-limiting diagram illustrating a concept of the interpolation processing according to the present embodiment.

FIG. 16 is a diagram illustrating a concept of the interpolation processing according to the present embodiment.

Referring to FIG. 16, here, one example of the performance status in FIG. 15 (B) is shown.

Specifically, the case that another game device operated by player Q progresses as delayed relative to the game device operated by player P is shown.

In addition, a case that note data of a played part (performance operation instruction data) is divided for each beat is shown.

As described above, in the performance status, with regard to the game device operated by player P, performance data from another game device operated by player Q is data corresponding to the frame of which performance has already ended. Therefore, in order to output sound of a part of another player of the currently played corresponding frame, in the present example, estimated presentation data based on the interpolation processing is generated.

Specifically, the interpolation processing in the present example makes use of information on a beat which can immediately be used within one bar and generates estimated presentation data at the timing of performance by the game device of current player P himself/herself, by referring to performance operation instruction data of the part of player Q and performance data received from another game device operated by player Q with regard to the game device of player P.

The information on a beat which can be used means that at least one piece of note data is present within beats of the part of another player and data of a frame corresponding to at least first note data of the beats of the part of another player is received.

In the present example, a case that information on a beat at a position 2-beat back from a beat of the part of another player is made use of at the timing of performance by the game device of current player P himself/herself is shown. As the information on the beat, by way of example, performance flag data generated based on comparison between note data within beats of the part of another player and operation data of the part of another player is employed. In a case of correct performance, performance flag data is on, and in a case of an incorrect performance, performance flag data is off.

It is noted that, with regard to whether or not there is information on a beat which can be used, at the timing of performance by the game device of current player P himself/herself, search is started from a beat immediately before the beat of the part of another player and whether or not a beat can be used is determined. Then, when the information on the immediately preceding beat cannot be used, whether or not information on a beat preceding by two beats can be used is determined, and the processing is repeated within a range of one bar. It is noted that, when there is no information on a beat which can be used in a range of one bar, estimated presentation data is not generated but the interpolation processing ends. In this case, namely, when there is no unprocessed presentation data of another player within a prescribed number of frames from the current frame as described above and when there is no information on a beat which can be used within a range of one bar from the current frame, a part of another player is silent. Though a case that estimated presentation data is not generated is described in the present example, for example, all-off performance flag data may be generated as estimated presentation data. Alternatively, a beat which can be used may be searched for by expanding a search range to a plurality of bars, without being limited to one bar.

<5.3 Specific Example of Generation of Estimated Presentation Data>

FIG. 17 is a diagram illustrating a specific example of generation of estimated presentation data according to the present embodiment. The processing is performed in the interpolation processing described above.

Referring to FIG. 17 (A), initially, a case (No. 1) that a configuration of note data is the same between a beat of a part played by another player and a beat of a part of another player which can be used at the timing of performance by the game device of the current player himself/herself is described.

Here, in the interpolation processing in the present example, a beat of the part played by another player at the timing of play by the game device of the current player himself/herself refers to a beat estimated in generation of estimated presentation data (hereinafter also referred to as an estimated beat), and a beat of a part of another player which can be used refers to a beat serving as an estimation source to be compared in generation of estimated presentation data corresponding to the estimated beat (hereinafter also referred to as an estimation source beat). Then, presentation data generated based on operation data in correspondence with data of the beat to be compared (estimation source beat) is made use of in generation of estimated presentation data.

In the present example, by way of example, beats are compared with each other to thereby generate estimated presentation data corresponding to the estimated beat.

Specifically, configurations of note data of the estimated beat and note data of the estimation source beat are compared with each other, and estimated presentation data corresponding to the estimated beat is generated in accordance with performance flag data corresponding to the estimation source beat based on a result of comparison. In the present example, a group of performance flag data corresponding to the estimation source beat is also refereed to as estimation use data. Namely, a group of performance flag data in a unit of beat is referred to as estimation use data. In addition, in the present example, estimated presentation data which is a group of performance flag data in a unit of beat is generated by way of example.

The estimated beat and the estimation source beat being the same in configuration of note data refers to a case that the number of notes in one beat is the same by way of example. For example, when a music is four-four time, one beat is equal to one quarter note. In this case, when a sixteenth note is included in a musical score, four sixteenth notes are arranged continuously to be a length of one beat.

In the present example, it is assumed that, by way of example of a configuration of note data in an estimated beat, four pieces of note data are arranged, and with regard to a configuration of note data in the estimation source beat as well, four pieces of note data are arranged.

Then, in the present example, a configuration of note data of an estimated beat and a configuration of note data of an estimation source beat are the same and brought in one-to-one correspondence. Therefore, estimation use data corresponding to the estimation source beat is made use of as it is as estimated presentation data corresponding to the estimated beat.

Specifically, estimated presentation data corresponding to the estimated beat is generated in accordance with estimation use data configured with performance flag data corresponding to the estimation source beat.

Here, performance flag data generated based on operation data in correspondence with the estimation source beat is shown as estimation use data.

Specifically, a case that performance flag data is set to on for first and third note data in the configuration of four pieces of note data in the estimation source beat and performance flag data is set to off for second and fourth note data is shown as estimation use data.

Namely, for the first and third note data, the performance flag data is set to on because of a correct operation, and for the second and fourth note data, the performance flag data is set to off because of an incorrect operation.

In the present example, since the configuration of the note data is the same, estimated presentation data corresponding to the estimated beat is generated based on the first and third on performance flag data in estimation use data.

Specifically, estimated presentation data in which performance flag data is set to on for the first and third note data in the estimated beat and the performance flag data is set to off for the second and fourth note data is generated.

Thus, at the timing of performance by the game device of the current player himself/herself, sound of the part of another player is output based on the estimated presentation data including the performance flag data.

Referring to FIG. 17 (B), a case (No. 2) that the estimated beat and the estimation source beat are different in configuration of note data is described. In the case of the present example, a case that a configuration of note data of the estimated beat is more than a configuration of note data of the estimation source beat is described.

The case that a configuration of note data of the estimated beat is more than a configuration of note data of the estimation source beat, refers, for example, to such a case that four pieces of note data are arranged as the configuration of note data of the estimated beat and two pieces of note data are arranged as the configuration of note data of the estimation source beat.

In the present example, since a configuration of note data in the estimated beat and a configuration of note data of the estimation source beat are different from each other and cannot be brought in one-to-one correspondence, estimated presentation data corresponding to the estimated beat is generated in accordance with performance flag data of estimation use data which is brought in correspondence.

Here, performance flag data generated based on operation data in correspondence with the estimation source beat is shown as the estimation use data.

Specifically, a case that performance flag data of first note data in the configuration of two pieces of note data in the estimation source beat is set to on and performance flag data of the second note data is set to off is shown as the estimation use data.

Namely, performance flag data of the first note data is set to on because of a correct operation, and performance flag data of the second note data is set to off because of an incorrect operation.

Then, in the present example, regarding the first note data among four pieces of note data in the estimated beat, the performance flag data is set to on because performance flag data of the first note data of the estimation use data which is brought in correspondence is set to on.

In addition, regarding the fourth note data among four pieces of note data in the estimated beat, the performance flag data is set to off because the performance flag data of the second note data of the estimation use data which is brought in correspondence is set to off.

Moreover, regarding second and third note data among four pieces of note data in the estimated beat, there is no note data of the estimation use data brought in correspondence (a rest position or the like), and therefore, next performance flag data brought in correspondence is made use of.

In the present example, performance flag data of the second note data in the estimation use data is made use of. Since the performance flag data is set to off, performance flag data of the second and third note data among four pieces of note data in the estimated beat is also set to off.

Thus, at the timing of performance by the game device of the current player himself/herself, sound of a part of another player is output based on estimated presentation data including the performance flag data.

Referring to FIG. 17 (C), a case (No. 3) that the estimated beat and the estimation source beat are different in configuration of note data is described. In the case of the present example, a case that a configuration of note data of the estimated beat is more than a configuration of note data of the estimation source beat is described.

In the present example, since a configuration of note data in the estimated beat and a configuration of note data of the estimation source beat are different from each other and cannot be brought in one-to-one correspondence, estimated presentation data corresponding to the estimated beat is generated in accordance with performance flag data of the estimation use data which is brought in correspondence.

Here, performance flag data generated based on operation data in correspondence with the estimation source beat is shown as the estimation use data.

Specifically, a case that performance flag data of the first note data in the configuration of two pieces of note data in the estimation source beat is set to on and performance flag data of the second note data is set to off is shown as the estimation use data.

Namely, performance flag data of the first note data is set to on because of a correct operation, and performance flag data of the second note data is set to off because of an incorrect operation.

Then, in the present example, regarding second note data among four pieces of note data in the estimated beat, the performance flag data is set to on because performance flag data of the first note data of the estimation use data which is brought in correspondence is set to on.

In addition, regarding fourth note data among four pieces of note data in the estimated beat, the performance flag data is set to off because the performance flag data of the second note data of the estimation use data which is brought in correspondence is set to off.

Moreover, regarding the first note data among four pieces of note data in the estimated beat, there is no note data of the estimation use data brought in correspondence, and therefore, next performance flag data brought in correspondence is made use of. In the present example, performance flag data of the first note data of the estimation use data is made use of. Since the performance flag data is set to on, performance flag data of the first note data among four pieces of note data in the estimated beat is set to on.

Furthermore, regarding the third note data among four pieces of note data in the estimated beat, there is no note data of the estimation use data brought in correspondence, and therefore, next performance flag data brought in correspondence is made use of. In the present example, performance flag data of the fourth note data in the estimation use data is made use of. Since the performance flag data is set to off, performance flag data of the fourth note data among four pieces of note data in the estimated beat is set to off.

Thus, at the timing of performance by the game device of the current player himself/herself, sound of a part of another player is output based on estimated presentation data including the performance flag data.

Referring to FIG. 17 (D), a case (No. 4) that the estimated beat and the estimation source beat are different in configuration of note data is described. In the case of the present example, a case that a configuration of note data of the estimated beat is more than a configuration of note data of the estimation source beat is described.

In the present example, since a configuration of note data in the estimated beat and a configuration of note data of the estimation source beat are different from each other and cannot be brought in one-to-one correspondence, estimated presentation data corresponding to the estimated beat is generated in accordance with performance flag data of the estimation use data which is brought in correspondence.

Here, performance flag data generated based on operation data in correspondence with the estimation source beat is shown as the estimation use data.

Specifically, a case that performance flag data of the first note data in the configuration of two pieces of note data in the estimation source beat is set to on and performance flag data of the second note data is set to off is shown as the estimation use data.

Namely, performance flag data of the first note data is set to on because of a correct operation, and performance flag data of the second note data is set to off because of an incorrect operation.

Then, in the present example, regarding the third note data among four pieces of note data in the estimated beat, the performance flag data is set to on because performance flag data of the first note data of the estimation use data which is brought in correspondence is set to on.

In addition, regarding the fourth note data among four pieces of note data in the estimated beat, the performance flag data is set to off because the performance flag data of the second note data of the estimation use data which is brought in correspondence is set to off.

Moreover, regarding first and second note data among four pieces of note data in the estimated beat, there is no note data of the estimation use data brought in correspondence, and therefore, next performance flag data brought in correspondence is made use of. In the present example, performance flag data of the first note data in the estimation use data is made use of. Since the performance flag data is set to on, performance flag data of the first and second note data among four pieces of note data in the estimated beat is set to on.

Thus, at the timing of performance by the game device of the current player himself/herself, sound of a part of another player is output based on estimated presentation data including the performance flag data.

Figure 18:
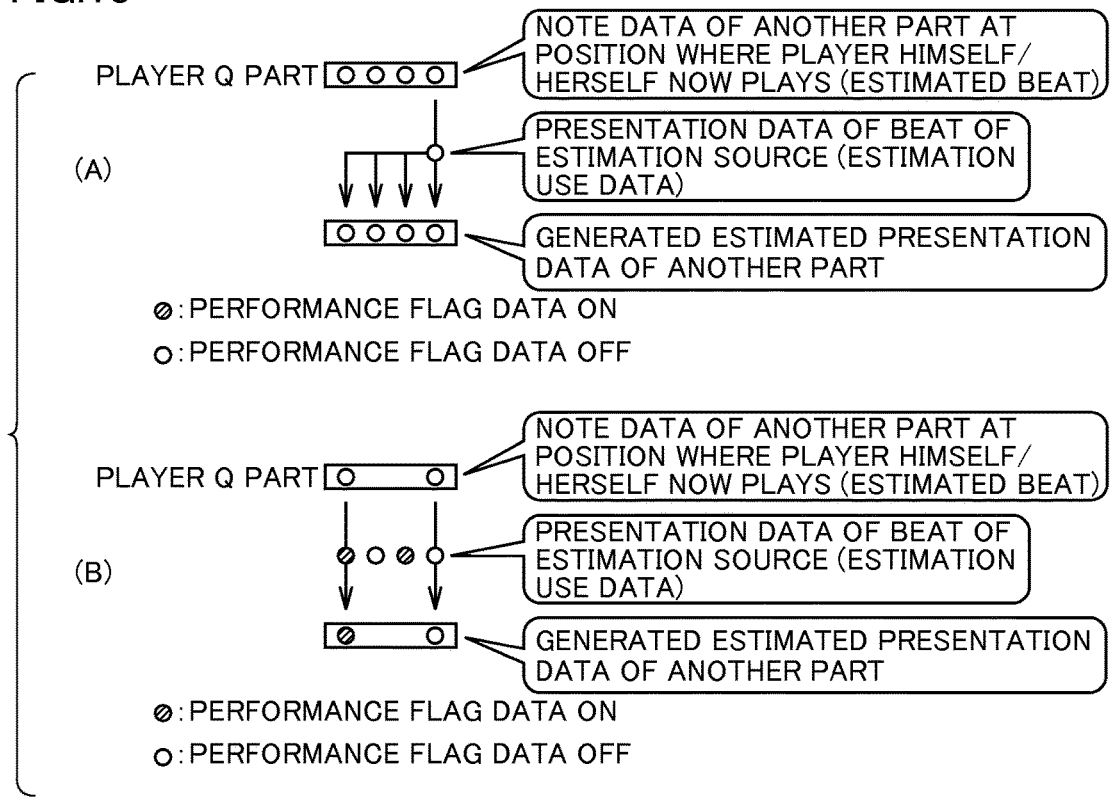
FIG. 18 shows another exemplary illustrative non-limiting diagram illustrating a specific example of generation of estimated presentation data according to the present embodiment.

FIG. 18 is another diagram illustrating a specific example of generation of estimated presentation data according to the present embodiment.

Referring to FIG. 18 (A), a case (No. 5) that the estimated beat and the estimation source beat are different in configuration of note data is described. In the case of the present example, a case that a configuration of note data of the estimated beat is more than a configuration of note data of the estimation source beat is described.

As described above, in the present example, since a configuration of note data in the estimated beat and a configuration of note data of the estimation source beat are different from each other and cannot be brought in one-to-one correspondence, estimated presentation data corresponding to the estimated beat is generated in accordance with performance flag data of the estimation use data which is brought in correspondence.

Here, performance flag data generated based on operation data in correspondence with the estimation source beat is shown as the estimation use data.

Specifically, a case that performance flag data of one piece of note data in the estimation source beat is set to off is shown as the estimation use data.

Then, in the present example, regarding the fourth note data among four pieces of note data in the estimated beat, the performance flag data is set to off because performance flag data of the first note data of the estimation use data which is brought in correspondence is set to off.

In addition, regarding first to third note data among four pieces of note data in the estimated beat, there is no note data of the estimation use data brought in correspondence (a case that there is no note data from the beginning), and therefore, the first performance flag data brought in correspondence is made use of. In the present example, since the first performance flag data is set to off, performance flag data of the first to third note data among four pieces of note data in the estimated beat is also set to off.

Thus, at the timing of performance by the game device of the current player himself/herself, sound of a part of another player is output based on estimated presentation data including the performance flag data.

Referring to FIG. 18 (B), a case (No. 6) that the estimated beat and the estimation source beat are different in configuration of note data is described. In the case of the present example, a case that a configuration of note data of a beat of a part of another player is less than a configuration of note data of a beat which can be used is described.

The case that a configuration of note data of the estimated beat is less than a configuration of note data of the estimation source beat, refers, for example, to such a case that two pieces of note data are arranged as the configuration of note data of the estimated beat and four pieces of note data are arranged as the configuration of note data of the estimation source beat.

In the present example, though a configuration of note data in the estimated beat is different from a configuration of note data of the estimation source beat, correspondence can be set because there are many configurations of note data of the estimation source beat. Therefore, estimated presentation data corresponding to the estimated beat is generated in accordance with performance flag data of the estimation use data which is brought in correspondence.

Here, performance flag data generated based on operation data in correspondence with the estimation source beat is shown as the estimation use data.

Specifically, a case that performance flag data of the first and third note data in the configuration of four pieces of note data in the estimation source beat is set to on and performance flag data of the second and fourth note data is set to off is shown as the estimation use data.

Namely, performance flag data of the first and third note data is set to on because of a correct operation, and performance flag data of the second and fourth note data is set to off because of an incorrect operation.

Then, in the present example, regarding the first note data of two pieces of note data in the estimated beat, the performance flag data is set to on because performance flag data of the first note data of the estimation use data which is brought in correspondence is set to on.

In addition, regarding the second note data of two pieces of note data in the estimated beat, the performance flag data is set to off because the performance flag data of the fourth note data of the estimation use data which is brought in correspondence is set to off.

Thus, at the timing of performance by the game device of the current player himself/herself, sound of a part of another player is output based on estimated presentation data including the performance flag data.

Though a case that, regarding note data not brought in correspondence, next performance flag data of the estimated beat which is brought in correspondence is made use of (when there is no note data from the beginning, first performance flag data is made use of) is described in the example above, limitation thereto is not particularly intended, and for example, previous performance flag data brought in correspondence may be made use of. For example, in FIG. 17 (B) above, though a case that, regarding the second and third note data among four pieces of note data in the estimated beat, next performance flag data of the estimation use data (performance flag data of the second note data) which is brought in correspondence is made use of is described, previous performance flag data, that is, performance flag data of the first note data, may be made use of. In that case, performance flag data of the second and third note data among four pieces of note data in the estimated beat in FIG. 17 (B) is also set to on, likewise the first note data. Alternatively, regarding note data not brought in correspondence, on/off of performance flag data may randomly be set, and various schemes are available as such a technique and limitation to one is not made.

Alternatively, estimated presentation data may be generated in consideration not only of correspondence of the performance flag data but also an amount of deviation from a correct operation. For example, sound of a part of another player may be output by estimating sound resulting from deviation by the same deviation amount in accordance with an amount of deviation from a correct operation.

<5.4 Description of Details of Specific Example of Generation of Estimated Presentation Data>

In the above, a configuration which may include four notes as the number of notes in one beat is described, and by way of example, a case that estimated presentation data corresponding to the estimated beat is generated in accordance with estimation use data (on/off of performance flag data) by bringing note data in the estimated beat and note data in the estimation source beat in correspondence with each other in a case that a length of a note is the same (a type of a note is the same) is described, however, a case that a length of notes is different (a type of notes is different) is also similarly applicable.

Specifically, since one piece of note data is constituted of a plurality of frames, presence or absence of an operation can be determined every one frame time (1/60 second), and on/off of performance flag data can be recorded.

Then, how many frames for one piece of note data have been played (on of performance flag data) may be counted and on/off of a part of a plurality of pieces of performance flag data (for each frame time) constituting another piece of note data different in length, which corresponds to a result of counting (for a corresponding frame time), may be set, so that estimated presentation data is generated.

On the other hand, in comparing note data in the estimated beat with note data in the estimation source beat, setting on/off of performance flag data for each frame in correspondence may not be efficient in terms of processing load.

In the present example, a scheme that one beat is divided for each prescribed period (by way of example, division into 12) and a prescribed number of pieces of performance flag data are processed in correspondence in advance in accordance with a type of note data will be described.

FIG. 19 is a diagram illustrating performance flag data in accordance with a type of note data according to the present embodiment.

Referring to FIG. 19 (A), in the present example, a case that one beat is divided into 12 sections is shown.

A sixteenth note corresponds to a length of ¼ of a quarter note. Therefore, in accordance with the division scheme, a sixteenth note corresponds to a period of three pieces of performance flag data.

Though not shown, in accordance with the similar scheme, an eighth note corresponds to a period of six pieces of performance flag data.

Note data different from common note data can also similarly be processed.

Referring to FIG. 19 (B), here, a triplet is described. A triplet corresponds to a period having a length of ⅓ of one beat. Therefore, in accordance with the division scheme, a triplet corresponds to a period of four pieces of performance flag data.

Referring to FIG. 19 (C), a quarter-note triplet is described here. A quarter-note triplet corresponds to a period having a length of ⅓ of two beats or a length of ⅔ of one beat. Therefore, in accordance with the division scheme, a quarter-note triplet corresponds to a period of eight pieces of performance flag data.

Since performance flag data can be processed in accordance with a type of each piece of note data with this scheme, note data having a special length other than a quarter note or an eighth note generally used in a musical score can be subjected to performance processing as unified to the same format and included in music data.

With this processing, for example, in generation of estimated presentation data according to the present embodiment above, processing similar to the processing described with reference to FIGS. 17 and 18 above should only be performed, by comparing twelve pieces of performance flag data at the maximum in accordance with note data of a beat of a part of another player at the timing of performance by the game device of the current player himself/herself (estimated beat) and twelve pieces of performance flag data at the maximum in accordance with note data of a beat of a part of another player which can be used (estimation source beat) with each other.

With this processing, even though lengths of note data included in the estimated beat and the estimation source beat are different from each other, performance flag data can readily be brought in correspondence, and estimated presentation data can efficiently be generated by setting on/off of performance flag data.

Though a case that estimated presentation data is generated based on correspondence of performance flag data of a beat is described in the present example by way of example, limitation to the scheme is not particularly intended, and for example, estimated presentation data may be generated in accordance with a type of a note.

For example, in a case that a type of a note of a beat of a part of another player is a quarter note and a type of a note of a beat which can be used is a sixteenth note at the timing of performance by the game device of the current player himself/herself, estimated presentation data in a beat (a quarter note) of a part of another player may be generated in accordance with performance flag data based on operation data for the sixteenth note. Specifically, estimated presentation data in a beat (a quarter note) of a part of another player can be generated in accordance with the number of pieces of on performance flag data based on the operation data for a sixteenth note. Alternatively, when performance flag data based on operation data for a sixteenth note is all on, performance flag data for a quarter note may also be expanded to all on so as to generate estimated presentation data of a beat of a part of another player. Moreover, in a case that a type of a note of a beat of a part of another player is a sixteen note and four sixteenth notes are provided in a beat and a type of a note of a beat which can be used is a quarter note and one quarter note is provided at the timing of performance by the game device of the current player himself/herself, estimated presentation data for the beat (the sixteenth note) of a part of another player may be generated in accordance with performance flag data based on operation data for the quarter note. Specifically, in accordance with setting to on of performance flag data based on operation data for one quarter note, estimated presentation data setting performance flag data to on for one sixteenth note of four sixteen notes in the beat (the sixteenth note) of the part of another player can be generated. Namely, estimated presentation data of the beat of the part of another player may be generated in accordance with the performance flag data based on the operation data for a length or the number of notes in a beat.

FIG. 20 is a diagram illustrating relation between an operation period of performance during a game and performance flag data according to the present embodiment.

Referring to FIG. 20, a case that performance flag data is managed in such a form that one beat is divided into 12 as described above is described in the present example.

By way of example, in the present example, an operation period of performance during a game with respect to a period corresponding to four pieces of performance flag data is shown. Specifically, a case that an operation is performed with the use of operation switch 14 (a performance button) from an intermediate point during a period corresponding to first performance flag data to an intermediate point during a period corresponding to fourth performance flag data is shown.

In this case, the operation period can determine presence or absence of operation data (an operation period) by obtaining operation data every frame time (1/60 second).

Then, determination as to whether or not performance flag data has been operated (generation of presentation data) can be made based on whether or not it is operated at the time point of switch between a period corresponding to a certain performance flag data and a period corresponding to next performance flag data (whether or not operation data is present). Namely, determination can be made based on whether or not there is operation data for a last frame in a plurality of frames constituting a period corresponding to certain performance flag data.

In the case of the present example, in accordance with the operation period above, operation data is determined as present for the last frame during a period corresponding to the first performance flag data, and first performance flag data is set to on. Similarly, operation data is determined as present for the last frame during a period corresponding to the second performance flag data, and the second performance flag data is set to on. Similarly, operation data is determined as present for the last frame during a period corresponding to the third performance flag data, and the third performance flag data is set to on. Regarding the fourth performance flag data, performance data is determined as absent for the last frame during a period corresponding to the performance flag data, and the fourth performance flag data is set to off.

With the processing, in generation of presentation data, it is not necessary to always monitor operation data during a period corresponding to performance flag data, and presence or absence of operation data for the last frame during a period corresponding to performance flag data should only be determined, that is, determination should only be made every prescribed period (a period corresponding to performance flag data). Therefore, processing load can be mitigated.

It is noted that determination about operation data is by way of example and another determination technique can naturally be employed. For example, if there is a period of operation even in part during a period corresponding to performance flag data, determination as on of performance flag data may be made. Alternatively, to the contrary, if only a part has been operated during a period corresponding to the performance flag data, performance flag data may uniformly be determined as off. Alternatively, a period corresponding to performance flag data may further finely be time-divided and determination may be made based on a ratio of a period of operation during the time-divided period.

6. Specific Example

Figure 21:
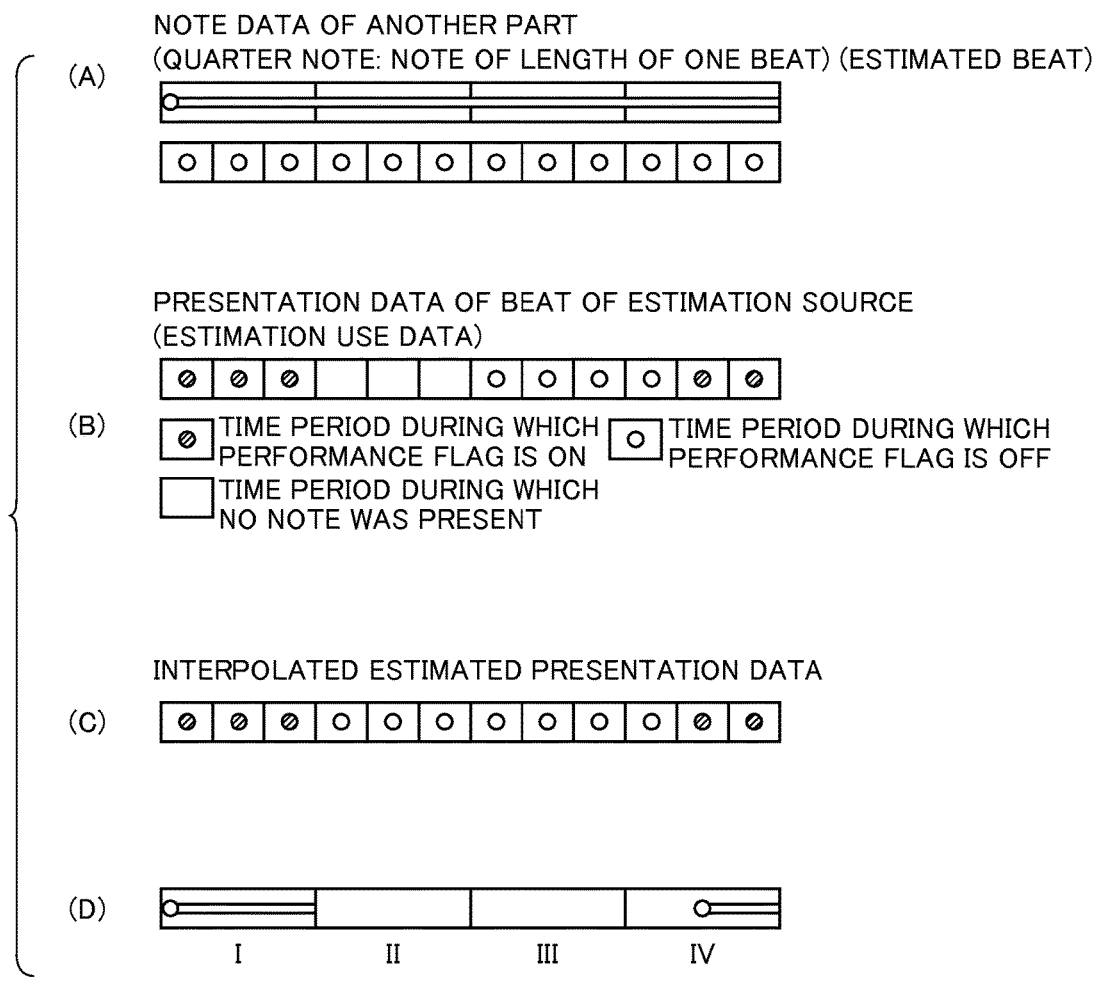
FIG. 21 shows an exemplary illustrative non-limiting diagram illustrating a specific example in which sounds of another part based on the interpolation processing are output according to the exemplary embodiment.

FIG. 21 is a diagram illustrating a specific example of output of sound of another part based on the interpolation processing according to the present embodiment.

Referring to FIG. 21 (A), here, a case that note data of a beat of a part of another player (estimated beat) is a quarter note by way of example at the timing of performance by the game device of the current player himself/herself is shown.

In this case, when one beat is divided into 12, a quarter note corresponds to a period of twelve pieces of performance flag data.

Referring to FIG. 21 (B), presentation data of a beat of a part of another player which can be used (estimation source beat) in the present example is shown.

Specifically, presentation data generated based on operation data for a configuration of note data of the estimation source beat (estimation use data) is shown.

In the present example, when one beat is divided into 12, information on a portion where performance flag data is set to on, a portion where performance flag data is set to off, and a portion where no performance flag data is present, that is, a portion where no note data is present (such as a rest position), is shown as the presentation data (the estimation use data).

Referring to FIG. 21 (C), generation of estimated presentation data is described.

Referring to FIGS. 17 and 18, in the present example, since a configuration of note data in the estimated beat and a configuration of note data of the estimation source beat are different from each other and cannot be brought in one-to-one correspondence, estimated presentation data corresponding to the estimated beat is generated in accordance with performance flag data of the estimation use data which is brought in correspondence.

Here, performance flag data generated based on operation data in correspondence with the estimation source beat is shown as the estimation use data.

Specifically, a case that performance flag data of first to third note data in the estimation source beat is set to on, there is no performance flag data in fourth to sixth data, seventh to tenth performance flag data is set to off, and eleventh and twelfth performance flag data is set to on is shown as the estimation use data.

Then, in the present example, regarding the first to third performance flag data among twelve pieces of performance flag data in the estimated beat, the performance flag data is set to on in accordance with correspondence with the estimation use data.

Regarding the seventh to tenth performance flag data among twelve pieces of performance flag data in the estimated beat, performance flag data is set to off in accordance with correspondence with the estimation use data.

In addition, regarding the eleventh and twelfth performance flag data among twelve pieces of performance flag data in the estimated beat, performance flag data is set to on in accordance with correspondence with the estimation use data.

On the other hand, since there is no estimation use data for the fourth to sixth performance flag data among twelve pieces of performance flag data in the estimated beat, they are not brought in correspondence.

In this case, next performance flag data brought in correspondence as described above is made use of. In the present example, the seventh performance flag data in the estimated beat is brought in correspondence with the estimation use data.

Therefore, by making use of the performance flag data, performance flag data of the fourth to sixth performance flag data among twelve pieces of performance flag data in the estimated beat is set to off by making use of the seventh performance flag data.

Referring to FIG. 21 (D), sound of a part of another player is output at the timing of performance by the game device of the current player himself/herself, based on note data of the part of another player and estimated presentation data of another player generated above. Specifically, regarding note data of a quarter note of the part of another player, sound is output during a period of three pieces of performance flag data in the case of division of one beat into 12 (a period I), no sound is output during a period of next six pieces of performance flag data (a period II and a period III), and sound is output during a period of last three pieces of performance flag data (a period IV).

As shown above, in the present embodiment, game device 10 determines whether or not sound of another part can be generated for each performance portion of a music to be played, by using another player performance data 53 stored in main memory 23 during a performance period. Specifically, whether or not there is presentation data in a corresponding frame of another player at the timing of performance by the game device of the player himself/herself is determined.

Then, when it is determined that there is no presentation data in the corresponding frame of another player, that is, in a performance portion where generation of performance sound of another part is impossible, estimated presentation data obtained by estimating presentation data based on obtained performance data of another game device is generated, and based thereon, performance sound of another part is output.

Thus, uncomfortableness due to influence by delay in communication or the like is suppressed and an ensemble game can be enjoyed without output of sound of another part as delayed relative to sound of a player part. In addition, since a performance status immediately before is reflected and performance is estimated, real-time feeling of a performance operation of another part can be realized and the game device of the player himself/herself can be operated in a real-time performance environment.

Other Embodiments

In the embodiment above, a performance operation for giving a performance is an operation of pressing an appropriate performance button at appropriate timing, however, any form of performance operation is applicable. For example, in a case that touch panel 15 of game device 10 is used as an input device, an image of a guitar or a piano is displayed on lower LCD 12 and an operation for touch input onto the screen of lower LCD 12 can be employed as a performance operation. Specifically, in a case of display of an image of a string of a guitar, game device 10 may calculate a direction and strength of strike of the string based on input onto touch panel 15 and output guitar sound based on the direction and strength. Furthermore, here, data indicating the direction and strength can be used as performance data (data).

In addition, in the present embodiment, though an ensemble game in which a plurality of players play in ensemble has been described by way of example, the present embodiment is applicable to a multiplayer game played by using a plurality of game devices. A game executed in the present game system may be, for example, a game in which a character displayed in a screen of a display is caused to dance to music by pressing a performance button at appropriate timing. It is noted that an input operation is not limited to input through a performance button, and an operation by a player may be sensed by making use of a motion sensor such as an acceleration sensor and a character may be caused to dance to the music with a sensing signal in accordance with the operation by the player serving as input. In this game, depending on each game device, a plurality of operated characters appear. In each game device, an operation (dance) by the plurality of characters performed in response to an operation by a player is displayed.

In the game system for executing such a game, likewise the ensemble game above, each game device accepts an operation for dancing a character to music.

The game device transmits motion data for specifying motion contents of an operation target (character) of a player to another game device, instead of performance data above. The motion data is, for example, operation data indicating an operation by a player.

Based on motion data received from another game device, while the game device controls an operation of another operation target, it controls motion of an operation target of a player in response to an operation by a player. Then, motion of a plurality of operation targets is displayed on a screen.

The present embodiment is applicable also to a dance game as described above.

Specifically, in the dance game, when motion data of an operation target (a character) of another player has not been received from another game device, for example, due to delay in communication or the like, motion data is estimated based on a previous operation status, and motion of an operation target (a character) of another player may be controlled and displayed on the screen based on the estimated motion data.

Furthermore, the present embodiment is similarly applicable also to another multiplayer-match-type game played through communication.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable music game program executable by one or more processors of a game device performing a game process which proceeds in accordance with a prescribed presentation procedure for music data, said music game program causing the one or more processors to perform comprising:
a communicator configured to obtain from another game device through communication, data relating to operation input to said another game device for a first portion of said music data;
a presentation data generator configured to generate presentation data in accordance with operation input to said game device;
an estimated presentation data generator configured to, if operation input to said another game device for a second portion of said music data has not yet been obtained or processed, estimate, based on the data relating to said operation input to said another game device for the first portion of said music data obtained through said communicator, presentation representing operation input to said another game device for the second portion of said music data as generated estimated presentation data representing the presentation; and
a game processor configured to perform said game process based on the presentation data in accordance with operation input to said game device for said second portion and said estimated presentation data.

2. The non-transitory storage medium according to claim 1, wherein the data relating to the operation input to said another game device for the first portion of said music data includes evaluation information indicating evaluation as compared with said prescribed presentation procedure, based on the operation input to said another game device for a reference of the first portion of said music data.

3. The non-transitory storage medium according to claim 2, wherein
said estimated presentation data generator estimates, based on said evaluation information to said another game device for the first portion of said music data obtained through said communicator, the presentation in accordance with the operation input to said another game device for the second portion of said music data not obtained through said communicator and generates said estimated presentation data representing the presentation.

4. The non-transitory storage medium according to claim 1, wherein
said estimated presentation data generator estimates, based on the data relating to said operation input to said another game device for the first portion corresponding to at least one section divided for each prescribed unit of said music data obtained through said communicator, the presentation in accordance with the operation input to said another game device for the second portion of said music data and generates said estimated presentation data representing the presentation.

5. The non-transitory storage medium according to claim 1, wherein
said estimated presentation data generator:
determines whether a plurality of element patterns constituting the first portion of the music data are identical to a plurality of element patterns constituting the second portion of said music data, and
estimates, in accordance with results of determination, based on the data relating to said operation input to said another game device corresponding to each of the plurality of element patterns constituting the first portion of said music data obtained through said communicator, the presentation in accordance with the operation input to said another game device for the second portion of said music data and generates said estimated presentation data representing the presentation.

6. The non-transitory storage medium according to claim 1, wherein said estimated presentation data generator:

determines whether an element pattern constituting the first portion of said music data is identical to an element pattern constituting the second portion of said music data, and estimates, in accordance with results of determination, based on a length of the operation input to said another game device for the element pattern constituting the first portion of said music data obtained through said communicator, the presentation in accordance with the operation input to said another game device for the element pattern constituting the second portion of said music data and generates said estimated presentation data representing the presentation.

7. The non-transitory storage medium according to claim 1, wherein said estimated presentation data generator:

determines whether a plurality of element patterns constituting the first portion of said music data are identical to a plurality of element patterns constituting the second portion of said music data, and estimates, in accordance with results of determination, based on the data relating to said operation input to said another game device for at least one of a length and the number of element patterns constituting the first portion of said music data obtained through said communicator, the presentation in accordance with the operation input to said another game device for the second portion of said music data and generates said estimated presentation data representing the presentation.

8. The non-transitory storage medium according to claim 7, wherein said element pattern is data relating to a type of a note.

9. The non-transitory storage medium according to claim 1, wherein said presentation data generator generates the presentation data in accordance with the operation input to said game device and presentation data in accordance with the operation input to said another game device.

10. The non-transitory storage medium according to claim 9, wherein said estimated presentation data generator:

determines difference between timing when the operation input to said game device for the second portion of said music data is obtained and timing when the operation input to said another game device for the first portion of said music data is obtained through said communicator, and does not estimate, in accordance with results of determination, the presentation in accordance with the operation input to said another game device for the second portion of said music data based on the data relating to said operation input to said another game device for the first portion of said music data obtained through said communicator, and said game processor performs said game process based on the presentation data in accordance with the operation input to said game device and said another game device for said second portion when said estimated presentation data is not generated.

11. The non-transitory storage medium according to claim 9, wherein said estimated presentation data generator:

determines whether the second portion of said music data is a prescribed portion, and does not estimate the presentation, in accordance with the operation input to said another game device for the second portion of said music data, based on the data relating to said operation input to said another game device for the first portion of said music data obtained through said communicator, when the second portion of said music data is determined as the prescribed portion, and said game processor performs said game process based on the presentation data in accordance with the operation input to said game device and said another game device for said second portion when said estimated presentation data is not generated.

12. A game device performing a game process which proceeds in accordance with a prescribed presentation procedure for music data, comprising:

a communicator obtaining from another game device through communication, data relating to operation input to said another game device for a first portion of said music data;

a presentation data generator generating presentation data in accordance with operation input to said game device;

an estimated presentation data generator, if operation input to said another game device for a second portion of said music data has not yet been obtained or processed, estimating, based on data relating to said operation input to said another game device for the first portion of said music data obtained through said communicator, presentation representing operation input to said another game device for the second portion of said music data as generated estimated presentation data representing the presentation; and a game processor performing said game process based on the presentation data in accordance with operation input to said game device for said second portion and said estimated presentation data.

13. A method of controlling a game device performing a game process which proceeds in accordance with a prescribed presentation procedure for music data, comprising the steps of:

obtaining from another game device through communication, data relating to operation input to said another game device for a first portion of said music data;

generating presentation data in accordance with operation input to said game device;

if operation input to said another game device for a second portion of said music data has not yet been obtained or processed, estimating, based on data relating to said operation input to said another game device for the first portion of said music data obtained through said communication, presentation representing operation input to said another game device for the second portion of said music data as generated estimated presentation data representing the presentation; and performing said game process based on the presentation data in accordance with operation input to said game device for said second portion and said estimated presentation data.

14. A game system having a game device performing a game process which proceeds in accordance with a prescribed presentation procedure for music data, comprising:

a processor system including at least one processor, the processor system being configured to at least:

obtain from another game device through communication, data relating to operation input to said another game device for a first portion of said music data;

generate presentation data in accordance with operation input to said game device;

if operation input to said another game device for a second portion of said music data has not yet been obtained or processed, estimate, based on obtained data relating to said operation input to said another game device for the first portion of said music data, presentation representing operation input to said another game device for the second portion of said music data as generated estimated presentation data representing the presentation; and perform said game process based on the presentation data in accordance with operation input to said game device for said second portion and said estimated presentation data.

15. The non-transitory storage medium according to claim 1, wherein the data relating to the operation input to said another game device for the second portion of said music data has not yet been obtained by the game device when there is delay in communication between the game device and the another game device.

16. The non-transitory storage medium according to claim 1, wherein the data relating to the operation input to said another game device for the second portion of said music data has not yet been obtained by the game device after a packet transmitted from the another game device to the game device was lost.

* * * * *